United States Patent
Patel et al.

(10) Patent No.: US 8,233,040 B2
(45) Date of Patent: Jul. 31, 2012

(54) MODULAR CAMERA AND CAMERA SYSTEM

(75) Inventors: Mehul Patel, Wrightstown, PA (US); Thomas J. Brobst, Allentown, PA (US); Richard Skokowski, Warminster, PA (US); Bruce Love, Pipersville, PA (US); Paul Poloniewicz, Doylestown, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 1053 days.

(21) Appl. No.: 11/943,268

(22) Filed: Nov. 20, 2007

(65) Prior Publication Data

US 2008/0164316 A1    Jul. 10, 2008

Related U.S. Application Data

(60) Provisional application No. 60/868,235, filed on Dec. 1, 2006.

(51) Int. Cl.
*H04N 7/18*       (2006.01)

(52) U.S. Cl. .............................. 348/86; 348/61; 396/419

(58) Field of Classification Search ................... 348/61, 348/86; 396/419, 424, 427
See application file for complete search history.

(56) References Cited

U.S. PATENT DOCUMENTS

| | | | |
|---|---|---|---|
| 3,149,666 A | 9/1964 | Coe | |
| 4,734,566 A | 3/1988 | Senda et al. | |
| 6,628,445 B2 | 9/2003 | Chaleff et al. | |
| 7,070,099 B2 | 7/2006 | Patel | |
| 7,540,670 B2 * | 6/2009 | Hida | 396/427 |
| 2003/0174209 A1 | 9/2003 | Piazzi et al. | |
| 2006/0047787 A1 | 3/2006 | Agarwal et al. | |
| 2006/0231209 A1 * | 10/2006 | Smith | 156/542 |

FOREIGN PATENT DOCUMENTS

| | | |
|---|---|---|
| DE | 69621237 T2 | 1/2003 |
| EP | 0823177 | 8/1997 |
| GB | 2428154 | 1/2007 |

(Continued)

OTHER PUBLICATIONS

Office Action, dated Sep. 30, 2010, issued by German Patent Office in corresponding application No. 10 2007 060 557.0-31.

(Continued)

*Primary Examiner* — Viet Vu
(74) *Attorney, Agent, or Firm* — Nelson Mullins Riley & Scarborough, LLP

(57) ABSTRACT

A modular camera having a chassis module, a camera module, an illumination module and a communications module that together form a cooling passageway. The chassis module has a back wall having a first end and an opposite second end, a bottom wall having at least one opening formed therein, a first fan mounted at the chassis back wall first end, and a second fan mounted at the chassis back wall second end. The camera module has a body, wherein the camera body is removably received through a hole formed through the chassis module back wall. The illumination module has a back wall, wherein the illumination module is removably coupled to the chassis module so that the illumination module back wall is spaced apart from the chassis module back wall. The communication module is removably coupled to the chassis module. The chassis module back wall, the camera module body, the illumination module back wall and the communications module together form a cooling channel.

29 Claims, 21 Drawing Sheets

FOREIGN PATENT DOCUMENTS

| | | |
|---|---|---|
| JP | 60177772 | 9/1985 |
| JP | 2002040554 A | 6/2002 |
| JP | 2004317900 A | 11/2004 |
| WO | 2004062269 | 7/2004 |
| WO | WO2005055123 | 6/2005 |

OTHER PUBLICATIONS

Examination Report, dated Nov. 22, 2010, issued by UK Patent Office in corresponding application No. GB0723324.0.
UK Search Report dated Mar. 18, 2008.
Response to Examination Report, dated Nov. 22, 2010, issued by UK Patent Office in corresponding Application No. GB0723324.0.
Examination Report, dated Jul. 14, 2011, issued by UK Patent Office in corresponding Application No. GB0723324.0.
Response to Examination Report, dated Jul. 14, 2011, issued by UK Patent Office in corresponding Application No. GB0723324.0.
Examination Report, dated Oct. 25, 2011, issued by UK Patent Office in corresponding Application No. GB0723324.0.
Response to Examination Report, dated Oct. 25, 2011, issued by UK Patent Office in corresponding Application No. GB0723324.0.
Response to Official Communication, dated Sep. 30, 2010, issued by German Patent Office in corresponding Application No. 10 2007 060 557.0-31.

* cited by examiner

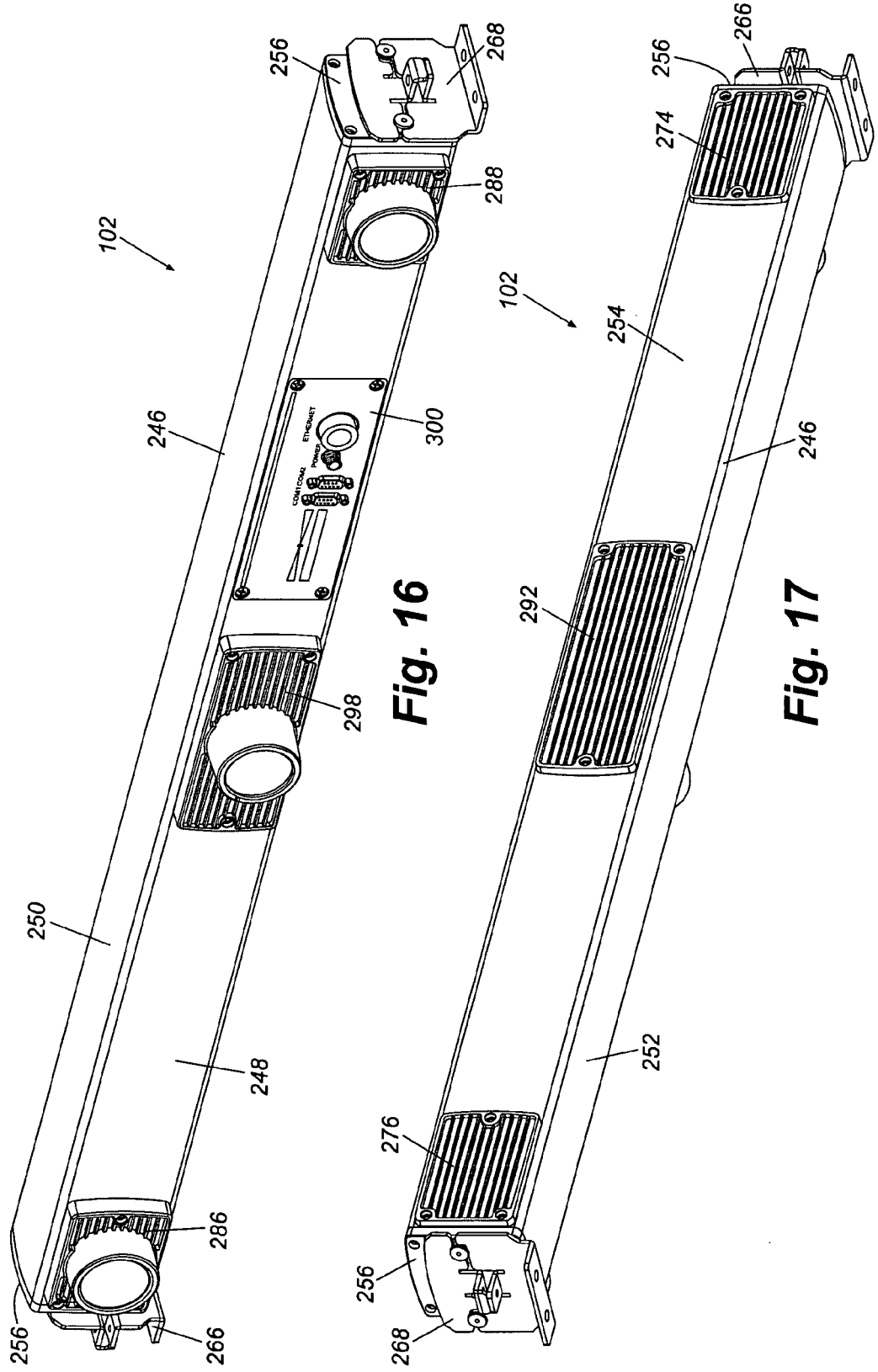

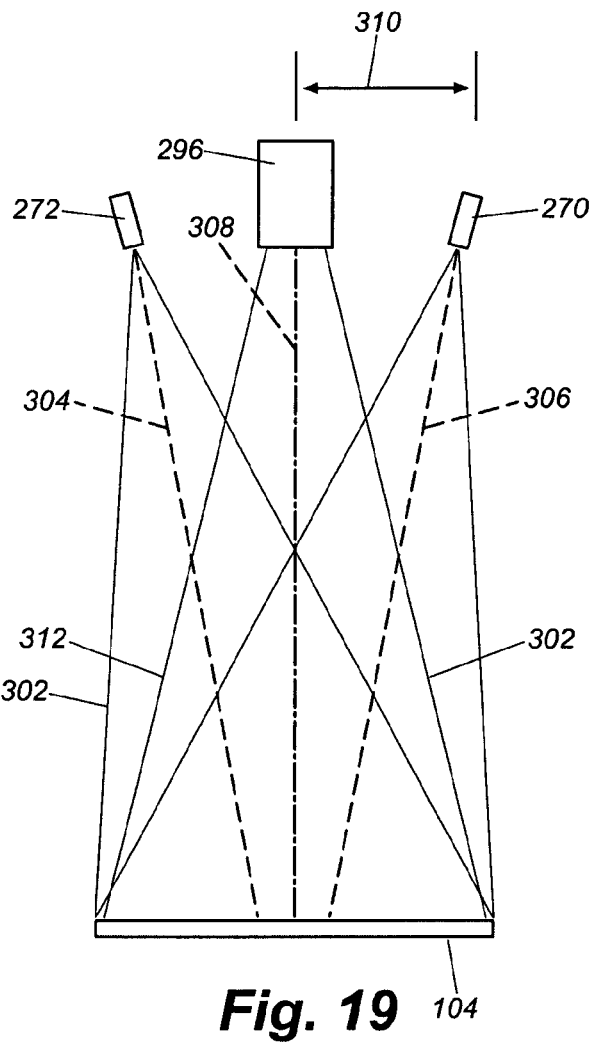
Fig. 19
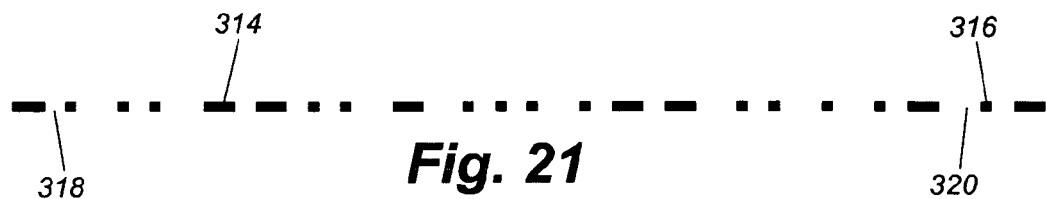
Fig. 20
Fig. 21

MODULAR CAMERA AND CAMERA SYSTEM

CLAIM OF PRIORITY

This application claims priority to U.S. Provisional Patent Application No. 60/868,235, filed Dec. 1, 2006, which is entitled "Modulated Camera," the entire disclosure of which is incorporated by reference herein.

FIELD OF THE INVENTION

The present invention relates to conveyor systems and, more particularly, to conveyor systems having networked components.

BACKGROUND OF THE INVENTION

Referring to art FIG. 1, a known dimensioning system 10 includes a conveyor system 12 that moves items along a path of travel, and a component system 14 adjacent to the conveyor system that tracks packages being moved by the conveyor system. Conveyor system 12 includes a number of rollers 16, a belt 24, a bed 18 and a tachometer 20. It should be understood that the conveyor can move the items through the path of travel by means other than belts, for example by driven rollers. Rollers 16 are motor-driven rollers that move conveyor belt 24 in a direction denoted by arrows 26 over bed 18, which provides support to the belt. For purposes of the present discussion, the direction corresponding to the start of conveyor system 12 is referred to as "upstream," whereas the direction in which conveyor belt 24 moves is referred to as "downstream."

Tachometer 20 is beneath and in contact with the surface of conveyor belt 24 and rotates with the belt as the belt moves in the direction of arrows 26. As tachometer 20 rotates, it outputs a signal comprising of a series of pulses corresponding to the conveyor belt's linear movement and speed. Tachometer 20, and other devices that provide signals corresponding to the rate of movement of a conveyor belt, from which the locations of items moving in a path of travel along the belt can be determined, should be understood by those of ordinary skill in the art. In general, the number of pulses output by tachometer 20 corresponds to the linear distance traveled by the belt, while pulse frequency corresponds to the belt's speed. The number of tachometer pulses per unit of measurement defines the resolution of the tachometer and its ability to precisely measure the distance that the conveyor belt has moved. Tachometer 20 may be replaced by a shaft encoder, particularly where less accurate measurements are needed.

Component system 14 includes a dimensioner 28, a plurality of barcode scanners 32, and a computer 36, all of which are attached to a frame 38. Frame 38 supports dimensioner 28 and at least one barcode scanner 32 horizontally above conveyor belt 24 so that beams of light emitted by the dimensioner and scanners intersect the top surfaces of packages moved by the belt. Frame 38 also supports additional scanners 32 vertically adjacent to conveyor belt 24 so that beams of light emitted by these scanners intersect the side, back, front or bottom surfaces of packages moved by the belt. One example of prior art scanners include QUAD X laser barcode scanners manufactured by Accu-Sort Systems, Inc. of Telford, Pa., although it should be understood that cameras or other suitable barcode readers could be used, depending on the needs of a given system.

As should be understood in this art, dimensioner 28 detects one or more dimensions of an item on a conveyor. The dimensioner is disposed along the conveyor at a known position relative to the bar code readers. When a package moving along the conveyor reaches the dimensioner, the dimensioner processor opens a package record, determines height, width and length, associates that data in the package record, and outputs the dimension data to the system processor in association with tachometer data that corresponds to the package's location at the dimensioner. Upon receiving the dimensioner data, the system processor opens a package record and associates with the package record the dimension and tachometer data received from the dimensioner.

The system processor also sets an open read window variable and a close read window variable for the barcode scanner. The open read window variable for the barcode scanner is equal to the tachometer value for the downstream-most point on the package, plus a known distance (in tachometer pulses) between the dimensioner and a predetermined position in the path of travel with respect to the barcode scanner. The close read window variable for the barcode scanner is equal to the tachometer value for the upstream-most point on the package, plus a known distance (in tachometer pulses) between the dimensioner and the predetermined position with respect to the barcode scanner.

As should be understood in this art, barcode reader 32 may comprise a laser scanner that projects a plurality of laser lines on the belt, for example in a series of "X" patterns. The scanner outputs a signal that includes barcode information reflected back from the laser lines and a barcode count, which indicates the position in the X patterns at which given barcode information was seen. Thus, the barcode count provides the lateral position on the belt, and the longitudinal position with respect to the centerline of the X patterns, corresponding to the barcode information. The barcode scanner assembly has a photodetector disposed along the conveyor immediately upstream from the X patterns. A processor at barcode scanner assembly 32 monitors the photo detector's output signal and thereby determines when the package's front and back edges pass the photodetector. The barcode scanner also receives the tachometer output. By associating the passage of the package's front and back edges by the photodetector with the tachometer data, the barcode scanner processor determines when the package passes through the X patterns. The barcode scanner processor accordingly determines when valid barcode data may be acquired for the package and acquires the barcode data during that period.

The barcode processor accumulates barcode data while a given package passes through the X patterns and transmits the accumulated barcode data to the system processor when the package reaches a predetermined point in the path of travel following the barcode scanner. More specifically, the barcode scanner processor knows when the front edge of the package passes by the barcode scanner photodetector. After acquiring the package's barcode data over a period based on the package's length, the barcode scanner processor holds the barcode data until a tachometer value the barcode scanner processor associates with the barcode data accumulates to a point indicating that the front edge of the package is at the predetermined point downstream of the scanner. The predetermined point is defined so that the longest package the system is expected to handle can clear the scanner's X patterns. The barcode scanner processor then outputs the barcode data to the system processor.

The system processor relies on tachometer pulses to correctly associate barcode data with a package record. The system processor determines the accumulated tachometer value at the time the barcode data is received from the barcode scanner processor. The open read window and close read window barcode variables for each package structure correspond to the distance between the dimensioner and the predetermined point downstream from the barcode scanner. Thus, the system processor compares the tachometer value associated with the received barcode data with the open read window and close read window barcode variables for the open package structures it maintains in memory. If the tachometer value is between the open read window barcode variable and close read window barcode variable for any open package structure, the system processor assigns the barcode data to that package record. If the tachometer value does not fall within the open window and close window barcode variables stored for any open package record, the barcode data is not assigned to a package record.

The described system of FIG. 1 was directed to barcode scanners that project an X-pattern across the belt. It should be understood to those skilled in the art that X-pattern scanners can be replaced with line scan cameras for detecting and reading barcodes. Line scan cameras like barcode scanners are bulky and heavy and require more than one technician to install and calibrate the scanner in scanning tunnel.

To initially set up and calibrate system 10, the camera tunnel frame is set up and the barcode cameras are mounted to the frame so that they are positioned and orientated properly with respect to the conveyor belt. This requires several technicians to lift the cameras into place in the tunnel and secure them to the frame. In general, prior art cameras are unitary structures that are bulky and cumbersome for a single technician to lift and secure. Moreover, because the cameras operate with high power, a large amount of heat must be expelled from the camera housing so as not to damage the camera electronics and optics. Thus, fans are enclosed in the camera housing to pull air through the housing to cool off the internal components.

Technicians connect each camera to a computer to individually calibrate and set the camera's operating parameters. The technician inputs camera information directly into the camera processor via the computer and may save certain camera settings to a dongle or other portable storage device. Calibration data may include the angle of orientation of the camera, the height of the camera and the location of the camera with respect to the belt and the dimensioner. Once each camera is calibrated and set-up in the tunnel, the cameras are connected to a central computer that receives information captured and processed by each camera. However, should a camera break or need to be serviced, a full calibration and set-up is necessary for the camera being replaced and possibly for the overall tunnel to ensure that all components of the tunnel are properly aligned.

In the system shown in FIG. 1, dimensioner 28 is a triangulation type dimensioner similar to those disclosed in U.S. Pat. Nos. 6,775,012, 6,177,999, 5,969,823, and 5,661,561, the entire disclosures of which are incorporated by reference herein. With regard to these embodiments, dimensioner 28 comprises a light source, such as a laser and a rotating reflector disposed within the dimensioner housing that produce a scanning beam (denoted in phantom at 40) that is directed down at conveyor belt 24. That is, the rotating reflector scans the single point light source across the width of belt 24. Each angular position of the reflector represents an x-axis location across the belt. Scanning beam 40 intersects belt 24 at line 42 in a manner that is transverse (x-axis 80) to the belt's linear movement (y-axis 82) in the path of travel at a fixed angle with respect to an axis normal (z-axis 84) to the belt's surface. Packages moving on belt 24, such as package 62, intersect scanning beam 40, thereby creating an offset in the scanning beam in the y-direction (along y-axis 82). In particular, the laser light source is positioned downstream in the y-axis 82 direction so that the plane of light is reflected at an angle from z-axis 84. Thus, as a box moves downstream the intersection of the plane of light is a continuous line across the belt in along x-axis 80. When a box intersects the plane of light, the portion of the plane intersected by the box will shift forward toward the light source since the light on the box travels a shorter distance than the light that intersects the belt on the left and right sides of the box. This offset or shift in the light on the box surface is proportional to the height of the box.

Both conveyor belt 24 and the packages thereon reflect light created by the scanning beam back to the rotating mirror, which reflects light to a linear array of line scan CCD detectors or a CMOS imager (not shown) within dimensioner 28. The array is oriented parallel to y-axis 82. Because the rotating mirror reflects both the outgoing and reflected laser light, the mirror returns the reflected light to a constant x-axis position, but the reflected light shifts in the y-direction correspondingly to the shift in line 42 caused by the height of a package 62 and the angle at which the scanned laser beam intersects the belt. Thus, the linear array of CCD or CMOS detectors must be accurately aligned in the y-direction to thereby detect the return light's y-axis shift. Moreover, because the array is made up of a single line of pixel sensors, the alignment is critical to detect the reflected light. If the axis of the linear sensor is misaligned with the fixed x-axis point where the mirror directs the reflected light, the sensor will not detect the change in height. The rotating mirror's angular position corresponds to the x-axis position of any given point of reflected light.

Dimensioner 28 generates a signal representative of the height of an object such as package 62 across conveyor belt 24 as described by the y-axis offset detected in scanning beam 40. The signal is also representative of the x-axis positions of the height data by association of that data with the mirror's angular position. Based on the height data and corresponding x-axis data, the dimensioner processor (not shown) determines the cross sectional height profile an object on the belt and, by accumulating such profiles along the object's length, the object's three dimensional profile.

As with the camera, technicians must lift and hold the dimensioner in place while it is secured to the tunnel frame. Next, levels are used to ensure that the dimensioner's detector is parallel to the face of the conveyor belt. If the dimensioner's detector array is out of a substantially parallel adjustment with respect to the belt, the dimensioner may obtain inaccurate dimensions of the object. Additionally, as previously described, should the line scan array not align properly with the rotating mirror, e.g. because of slight misalignments between the array and the rotating mirror, the dimensioner may not detect any shift in the light. Moreover, the rotating mirror may become misaligned during shipping or installation through jarring of the dimensioner.

SUMMARY

The present invention recognizes and addresses the foregoing considerations, and others, of prior art constructions and methods.

These and/or other objects are achieved in a preferred embodiment of a modulated camera comprising a chassis module, a camera module, an illumination module and a communications module. The chassis module has a back wall having a first end and an opposite second end, a bottom wall having at least one opening formed therein, a first fan mounted at the chassis back wall first end, and a second fan mounted at the chassis back wall second end. The camera module has a body, a sensor and camera optics, wherein the camera body is removably received through a hole formed through the chassis module back wall. The illumination module has a back wall, and a light source mounted to the back wall, wherein the illumination module is removably coupled to the chassis module so that the illumination module back wall is spaced apart from the chassis module back wall. The communication module has at least one heat sink formed therein, wherein the communication module is removably coupled to the chassis module and the at least one heat sink is received through the chassis module bottom wall at least one opening. The chassis module back and bottom walls, the camera module body, the illumination module back wall and the communications module at least one heat sink together form a cooling channel.

In some embodiments, the first and second fans close opposing ends of the cooling channel. In other embodiments, the cooling channel walls contain a plurality of cooling fins formed on at least one of the chassis module back wall, the camera body and the illumination module back wall. In other embodiments, the chassis module further comprises at least two mounting brackets for mounting the chassis module to a scanning tunnel frame. Yet in other embodiments, the chassis module comprises at least two hinged brackets for coupling the communications module to the chassis module.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIGS. 16 and 17 are perspective views of a range finder in accordance with an embodiment of the present invention;

FIG. 19 is a schematic view of the range finder of FIG. 16;

FIG. 20 is a laser pattern for the range finder in accordance with an embodiment of the present invention;

FIG. 21 is an exploded view of a portion of the laser pattern shown in FIG. 20;

Figure 1:
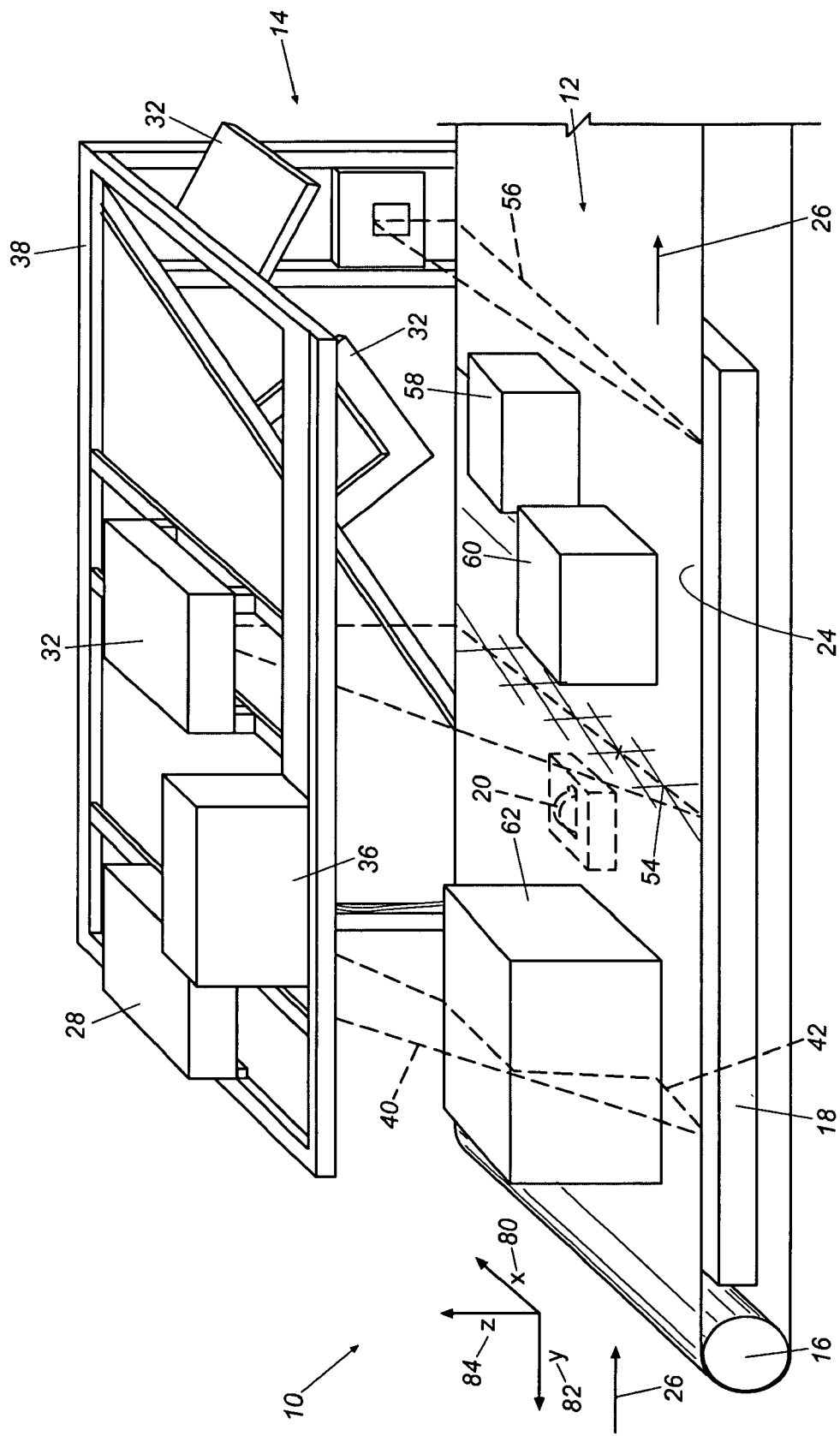
FIG. 1 is a prior art schematic representation of a dynamic dimensioning system.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Figure 2:
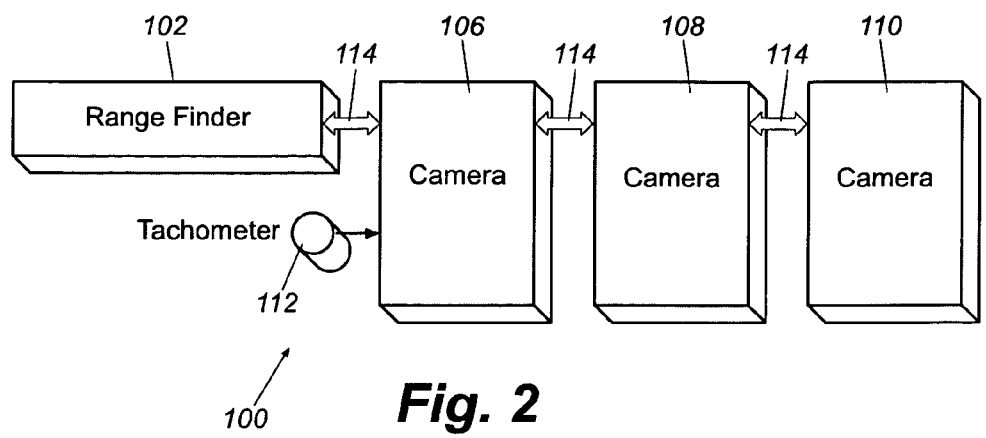
FIG. 2 is a block diagram of a dynamic dimensioning system in accordance with an embodiment of the present invention.

Referring to FIG. 2, a dynamic dimensioning system 100 generally comprises a range finder 102 or other dimensioning device (i.e., a dimensioner, light curtains, etc.) for determining the height and rough dimensions of a box being transported on a conveyor, multiple cameras 106, 108, 110 and a tachometer 112 connected to at least one camera 106 that outputs a signal representative of the movement of the conveyor belt. The range finder and the cameras are networked together by, for example, an Ethernet connection 114. While only three cameras are shown in FIG. 2, it should be understood that any number of cameras can be networked together to form a scanning tunnel. One of skill in the art should understand that Ethernet is a local-area network (LAN) architecture that uses a bus or star topology and supports data transfer rates of 10 Mbps. Ethernet uses the CSMA/CD access method to handle simultaneous demands and is one of the most widely implemented LAN standards. A newer version of Ethernet, called 100 Base-T (or Fast Ethernet), supports data transfer rates of 100 Mbps, and the newest version, Gigabit Ethernet supports data rates of 1 gigabit (1,000 megabits) per second.

Figure 3:
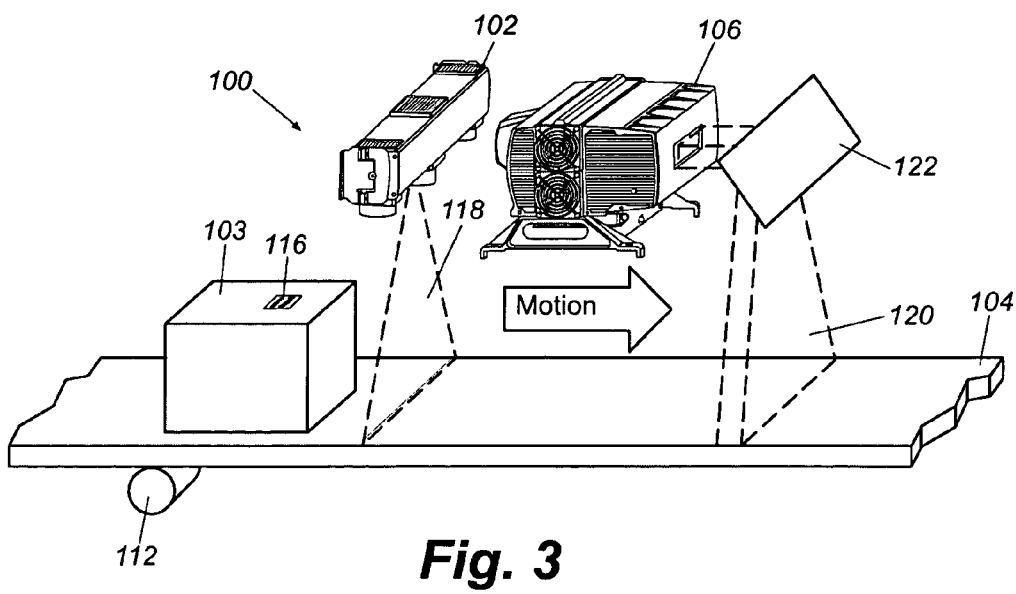
FIG. 3 is a schematic representation of a portion of the dynamic dimensioning system of FIG. 2.

Referring to FIG. 3, dynamic dimensioning system 100 scans objects, such as object 103, moving on a conveyor belt 104, decodes barcodes 116 located on the object and transmits the information to a host system (not shown) for further processing. Shown in the figure is a top read barcode camera 106 and range finder 102 in accordance with one embodiment of the present invention. In general, objects are moved through a field of view 118 of range finder 102. Range finder 102 detects the presence of object 103 and determines the range, extent and orientation of the object with respect to the conveyor belt. The extents of object refer to the left and right edges of the object along x-axis 80. The range finder generates an object start trigger that notifies the cameras (only one of which is shown in FIG. 3) of the presence of the object as well as an object end signal. Range finder 102 transmits height and extent data to camera module 106, which uses the information to focus its optics to maximize the efficiency and effectiveness of detecting and reading barcode 116.

Referring again to FIGS. 2 and 3, each camera 106, 108 and 110 uses the tachometer data to track the motion of object 103 through a field of view 120 of the camera's imaging sensor (not shown in FIGS. 2 and 3). Each camera processes the video data stream and locates and decodes any barcode data present on the object by detecting light reflected from the object being scanned. Once the object reaches a predetermined distance downstream from the tunnel system (this point is set by the host), the system transmits the barcode data to the host system for further processing. It should be understood that camera 106 may be mounted to direct its field of view 120 directly onto conveyor 104, or the field of view may be redirected by a mirror 122 as shown in FIG. 3. Redirect the field of view allows the camera to be positioned so that its scanning image is parallel to y-axis 82, where mirror 122 redirects the field of view along z-axis 84.

Figure 4:
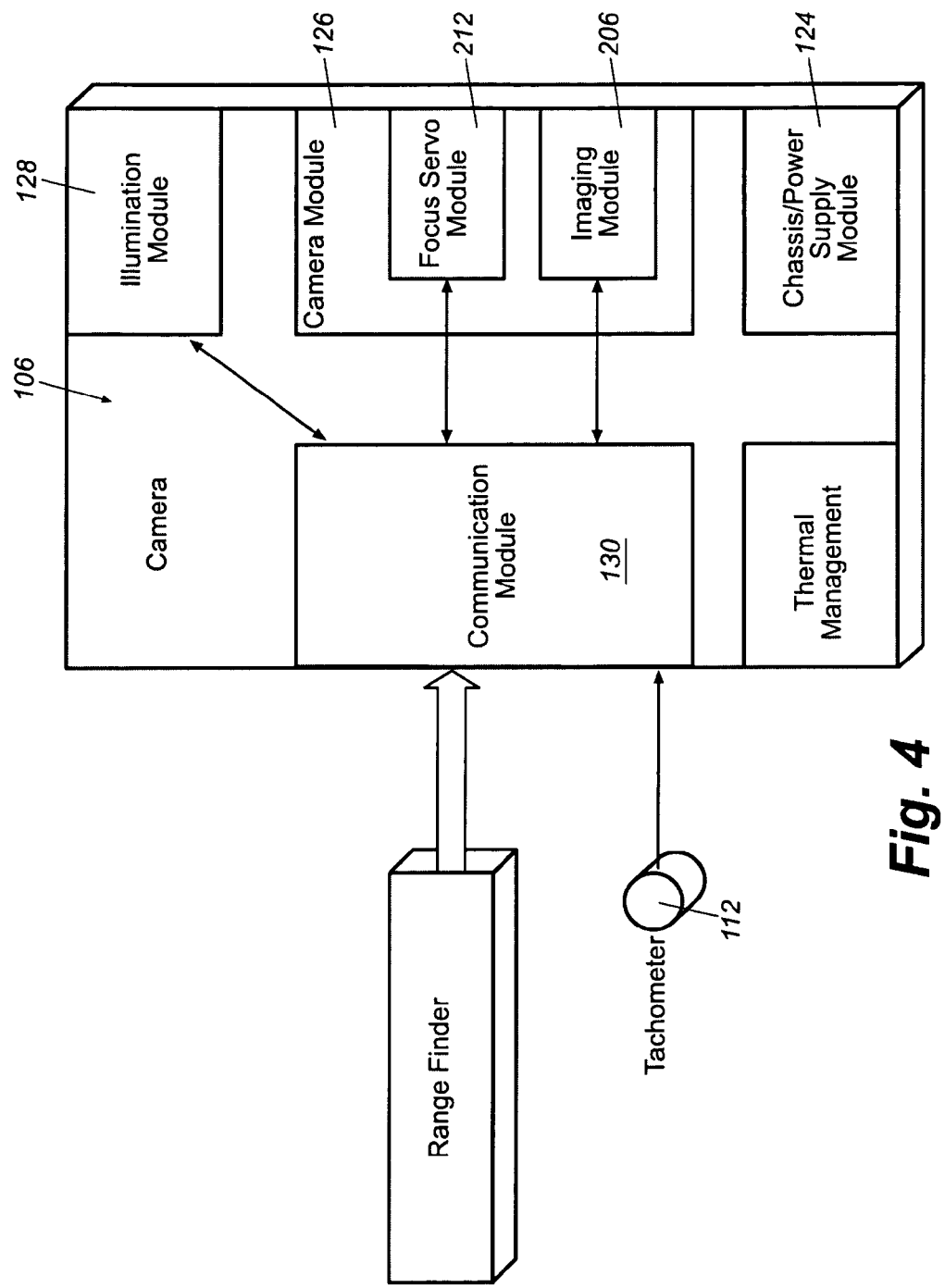
FIG. 4 is a block diagram of a camera for use in the dynamic dimensioning system of FIG. 2.
Figure 5:
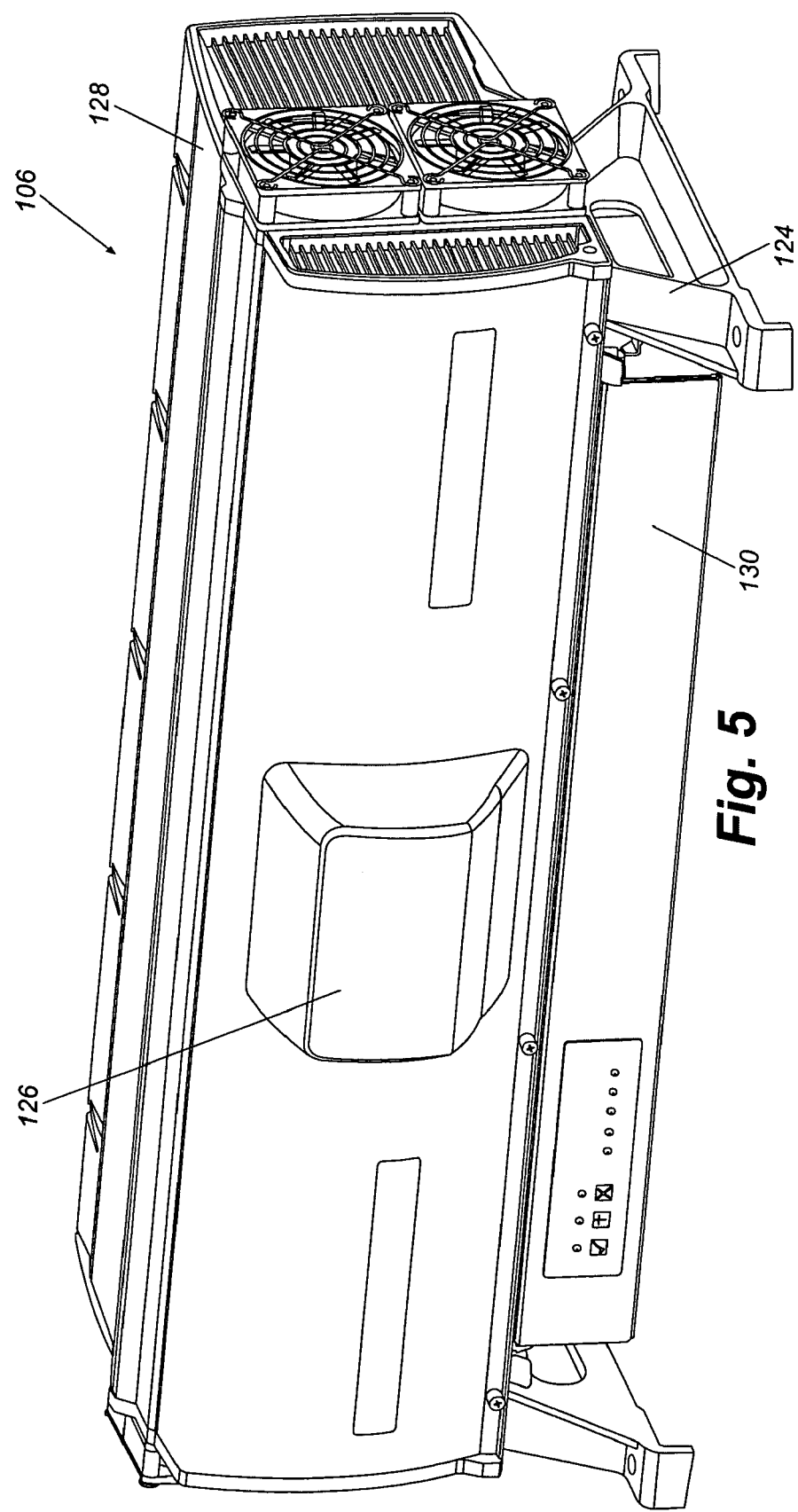
FIG. 5 is a perspective view of the camera shown in FIG. 4.
Figure 6:
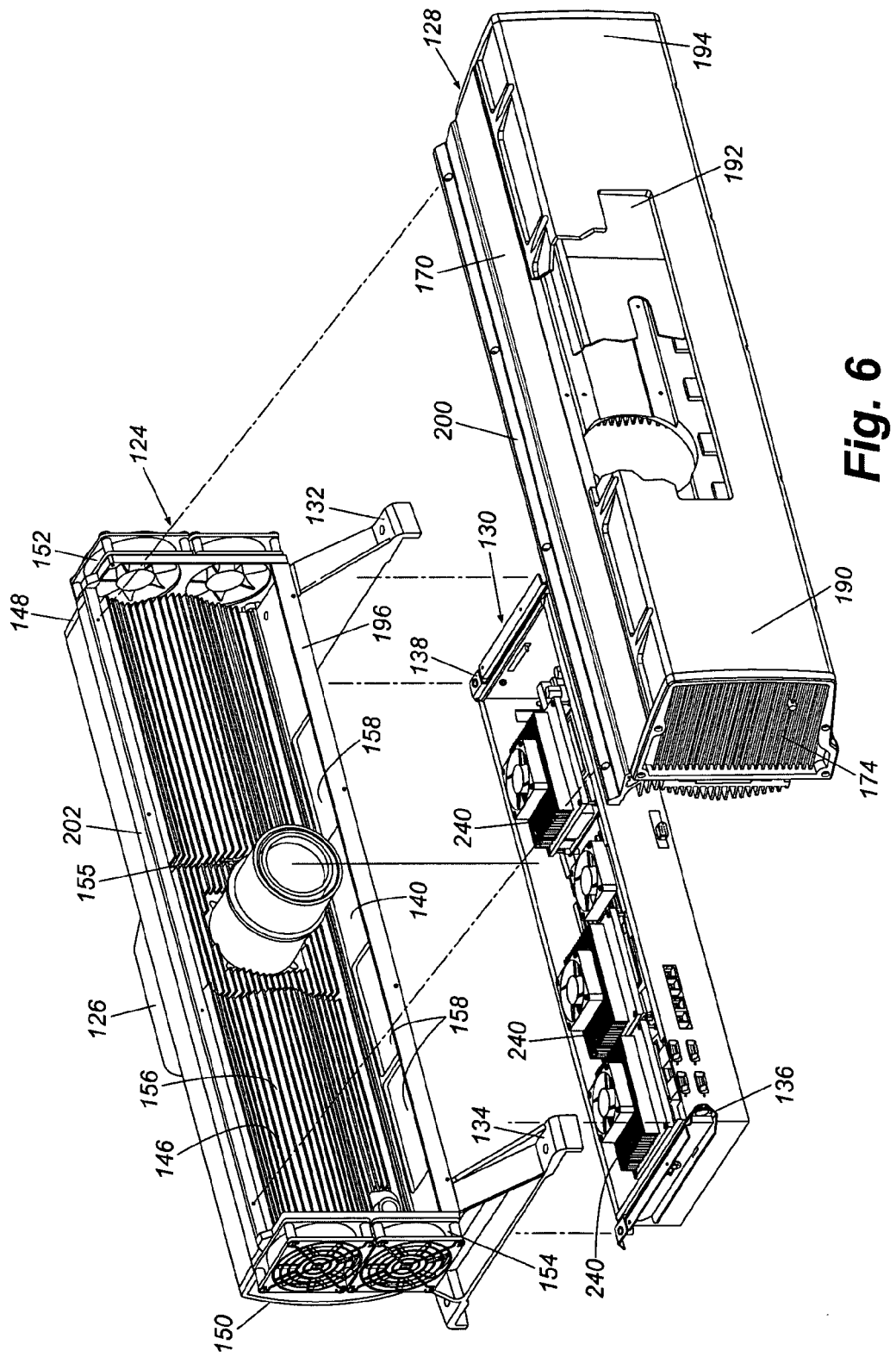
FIG. 6 is an exploded perspective view of the camera shown in FIG. 4.

For ease of discussion, only one of cameras 106, 108 and 110 will be discussed in detail, but it should be understood that cameras 106, 108 and 110 are structurally and electronically the same. Referring to FIGS. 4-6, camera has a chassis module 124, a camera module 126, an illumination module 128 and a distributed processing and communications module 130. The modular design allows for camera 106 to be disassembled during installation to reduce the amount of weight that must be lifted and mounted at any given time.

Figure 7:
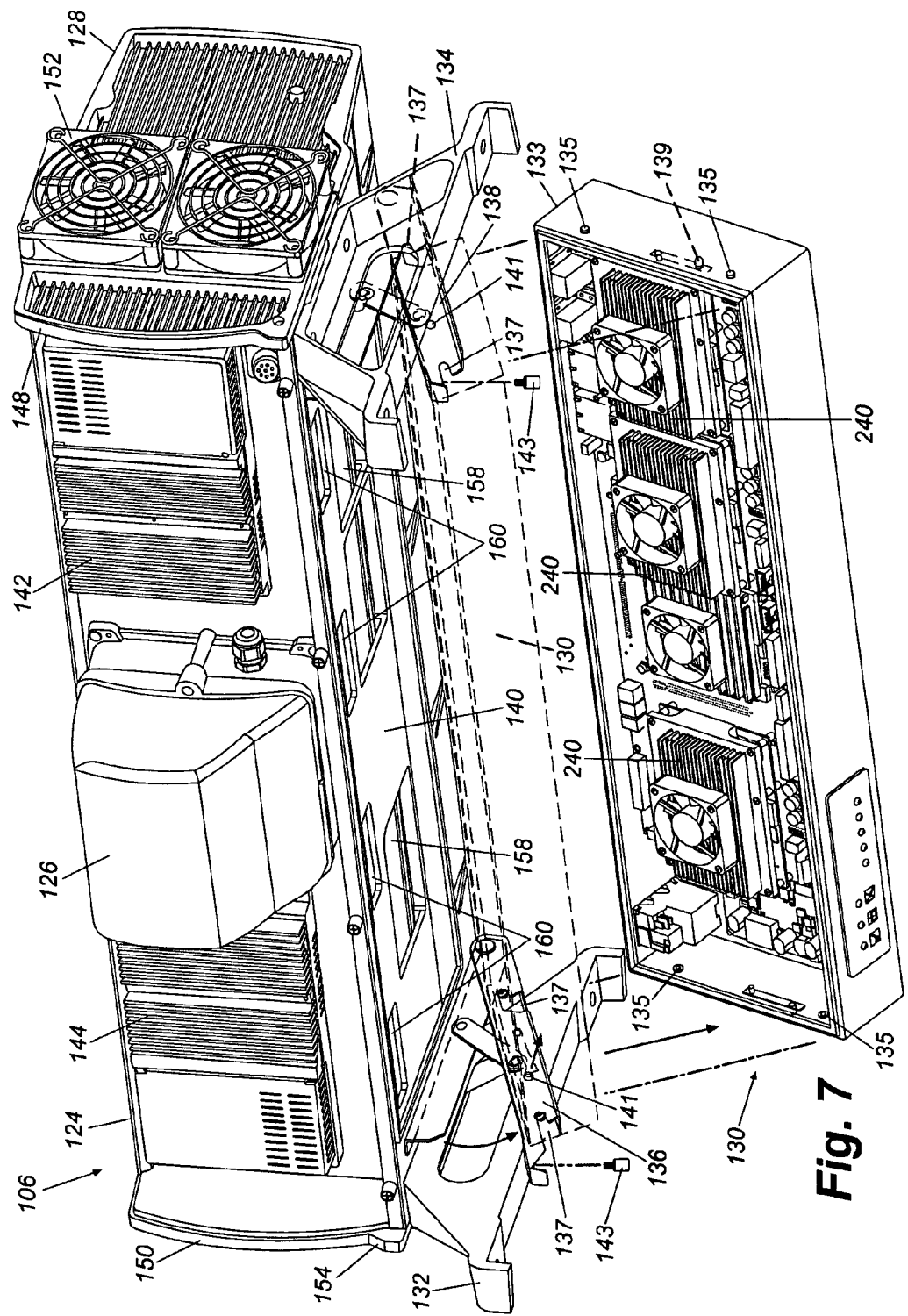
FIG. 7 is an partial exploded perspective view of the camera shown in FIG. 4.

Referring to FIG. 7, chassis module 124 has two fixed brackets 132 and 134 for mounting the chassis module to the scanning tunnel. Two hinged brackets 136 and 138, located on an underside 140 of chassis module 124 adjacent to respective brackets 132 and 134, moveably secure distributed processing and communications module 130 to the chassis module underside. In particular, distributed processing and communications module 130 has four fixed pins 135 that are received in slots 137 formed in hinged brackets 136 and 138. Two spring loaded pins 139 are received in holes 141 formed in hinged brackets 136 and 138 to releasably secure the communications module to the hinged brackets. Two fasteners 143 fasten the ends of moveable brackets 136 and 138 to the chassis module underside 140 to positively maintain the communications module in a closed position. Fasteners 143 may be screws, bolts, or other suitable fasteners.

Mounted within chassis module 124 are two power supplies 142 and 144 that convert AC power into DC power. Power supply 142 provides approximately 350 watts of DC power for use by distributed processing and communications module 130 and camera module 126. Power supply 144 provides approximately 290 watts of DC power for use by illumination module 128. A DC power distribution board (not shown) generates the required DC voltages that are not provided directly by power supplies 142 and 144.

Referring again to FIG. 6, a rear wall 146 is covered by a plurality of metal fins 156 for dissipating heat generated by power supplies 142 and 144. Mounted on opposite ends 148 and 150 of rear wall 146 are two sets of fans 152 and 154. Fans 152 pull air into chassis module 124, and fans 154 push air out. A rectangular opening 155 receives camera module 126, which is secured in place by fasteners, such as screws, bolts or other suitable fasteners. Chassis module underside 140 defines a plurality of openings 158 for receiving heat sinks 240 (FIGS. 5 and 6) from distributed processing and communications module 130. Openings 158 are sized and shaped to snuggly fit the heat sinks so that the communication module interior is sealed off from the area surrounding rear wall 146. It should be understood that gaskets (not shown) may be used around the periphery of the openings to increase the sealing effect, for example rubber, silicon, or other polymer type gaskets, for example rubber, silicon, or other polymer or elastomer type gaskets.

Figure 8:
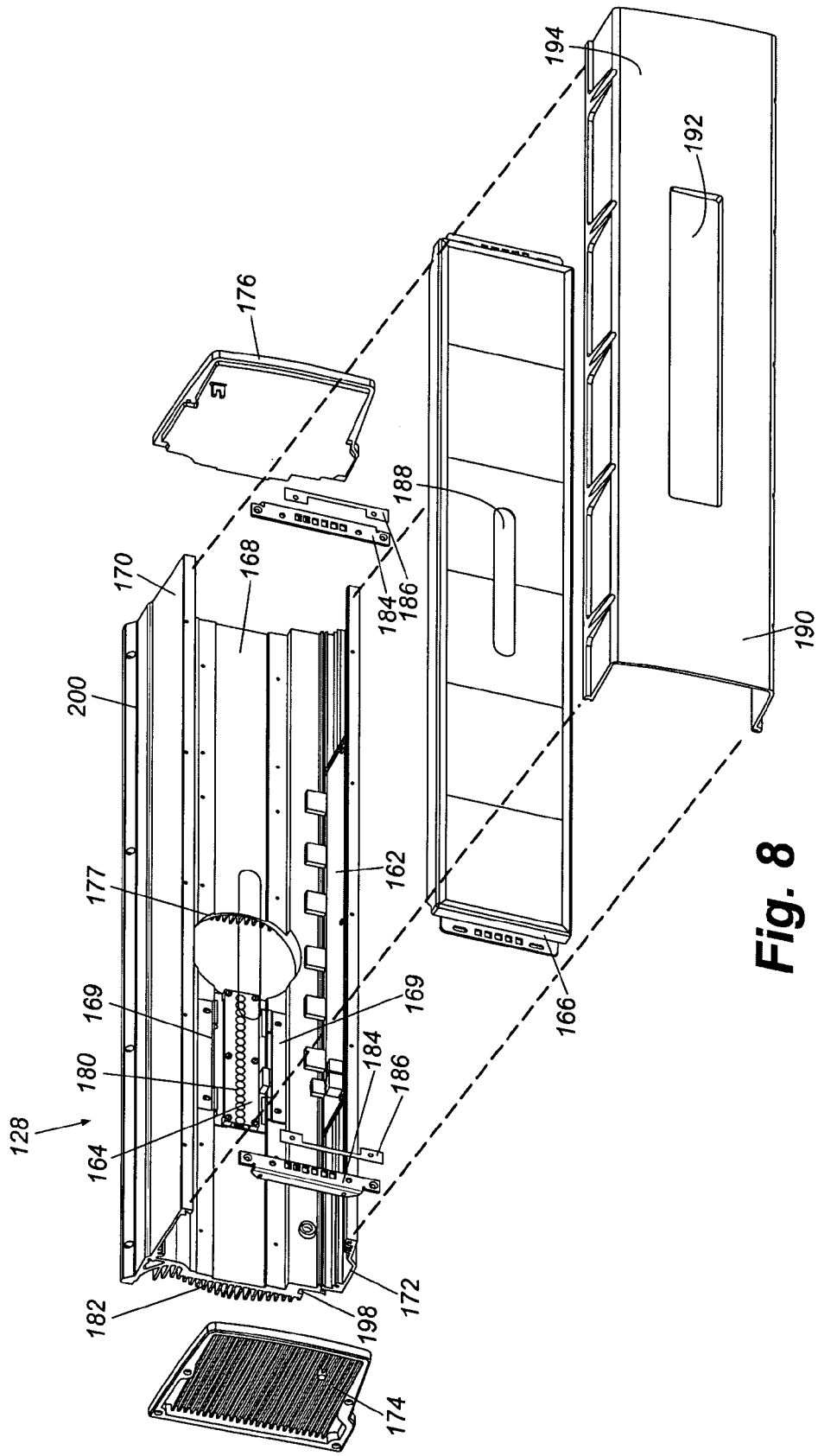
FIG. 8 is an exploded perspective view of an illumination module for use in the camera shown in FIG. 5.
Figure 9:
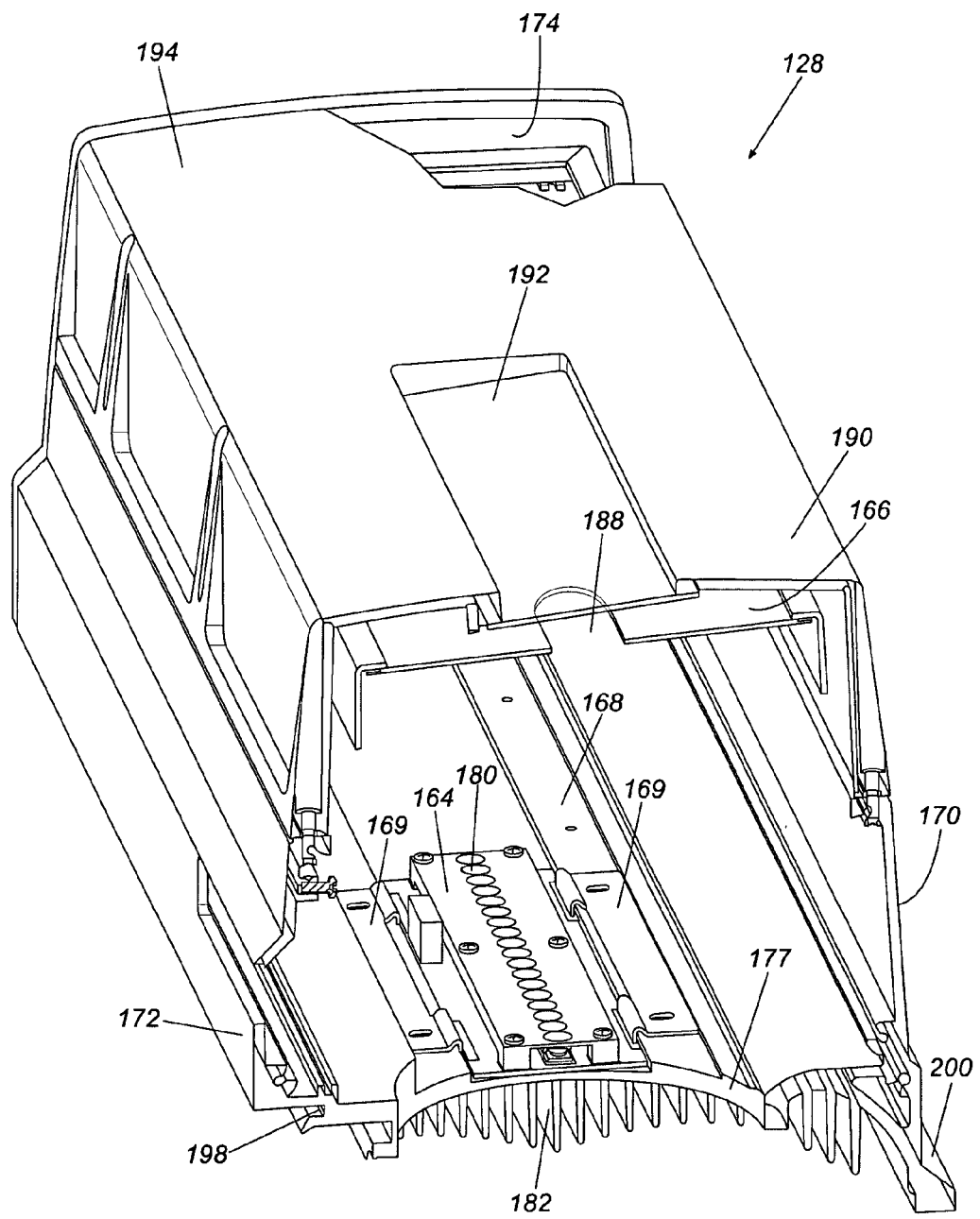
FIG. 9 is a perspective cutaway view of the illumination module shown in FIG. 8.
Figure 10:
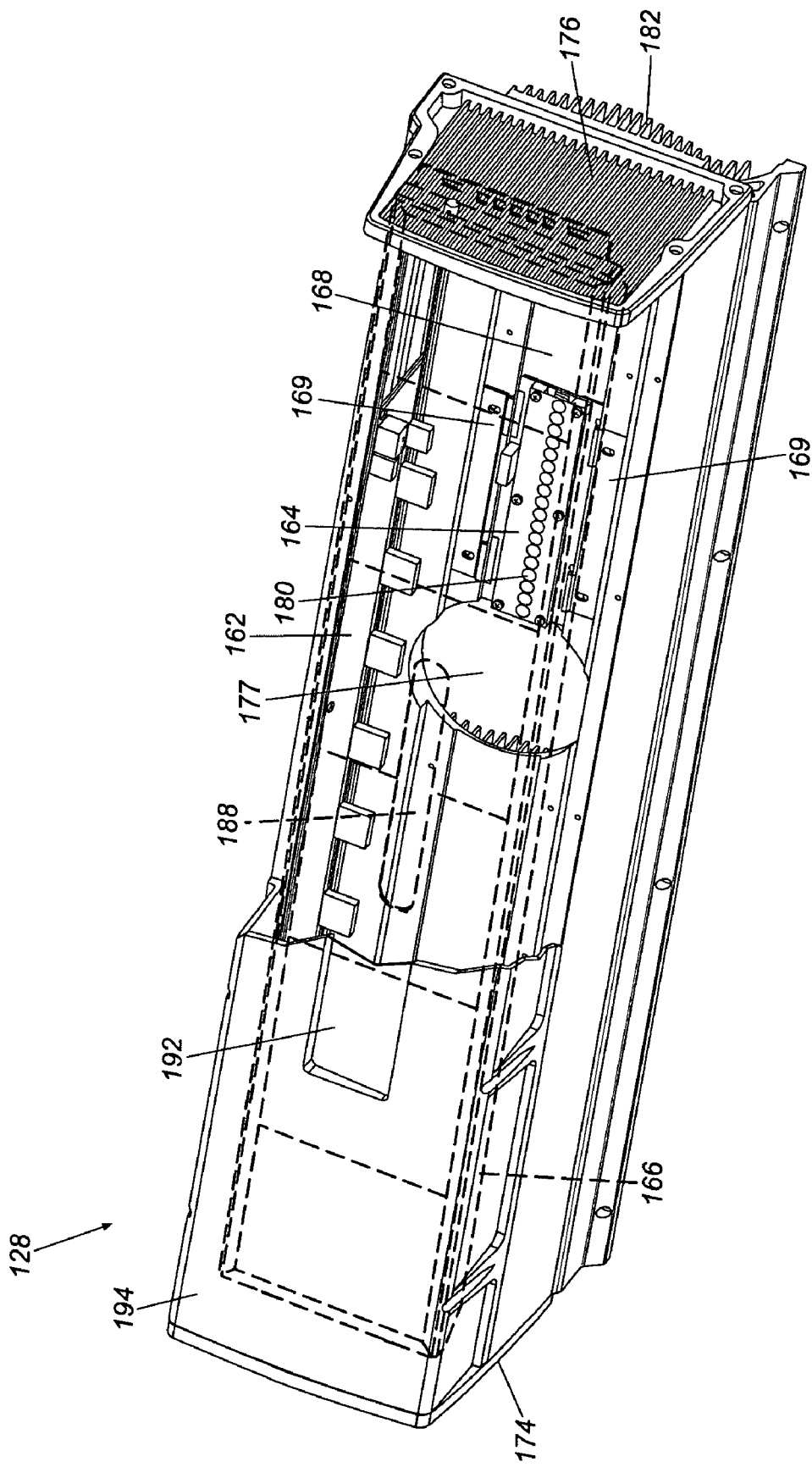
FIG. 10 is a perspective partial cutaway view of the illumination module shown in FIG. 9.

Referring to FIGS. 8 to 10, illumination module 128 comprises an illumination servo and control system 162, LED boards 164 (only one of which is shown in the Figures), and illumination optics 166. All of the components are mounted in a housing formed from a rear wall 168, a top wall 170, a bottom wall 172 and two end caps 174 and 176. A hole 177 is formed through back wall 168 to allow the camera lens to extend through into the illumination module behind illumination optics 166, as described in further detail below.

Illumination servo and control system 162 is mounted on bottom wall 172, connects to LED boards 164 via cables and receives command signals from a processor (not shown in the Figures) in camera module 126, which is used to set the intensity level of illumination for the LEDs. LED boards 164 are mounted on back wall 168 by brackets 169, provide a mounting area for LEDs 180 and conduct away heat produced by LEDs 180 through metal fins 182 formed on rear wall 168. In one embodiment, each LED board 164 may be six inches long and may contain eighteen LEDs aligned in a single row. The LEDs are arranged in an interleaved pattern so that if there is a fault in one string of LEDs, the resulting dark LEDs will be spread out across the boards to thereby maintain a uniform illumination field. In one preferred embodiment, illumination module 128 contains six LED boards.

Illumination optics 166 collimates light output of LEDs 180 and focuses the light into a line that is coplanar with an imaging sensor viewing plane (not shown in FIGS. 8 to 10). Illumination optics 166 comprises two separate cylindrical Fresnel lenses generally denoted by 166, which shows the two lenses as a single unit: the first is parallel to the axis of illumination to focus the LED light to a narrow plane that is coplanar with the imaging sensor scanning plane, and the second lens is arranged perpendicular to the first to spread out the light from each LED board along the scan line to cover the full field of view required of the system. It should be understood that in other embodiments, a single Fresnel lens or a refractive optical element can be used in place of the double Fresnel lens. Fresnel lens 166 is mounted to end caps 174 and 176 by mounting brackets 184 and spacers 186. Fresnel lens 166 defines an opening 188 to allow light reflected from a surface to reach the camera optics of camera module 126, as further described herein.

Enclosing the space defined by illumination module back wall 168, top wall 170, bottom wall 172 and end caps 174 and 176 is a shroud 190. Shroud 190 is preferably formed from a transparent material to allow light from LEDs 180 to pass through the shroud onto the surface being illuminated and allow reflected light to pass back through to the camera optics. Thus, shroud 190 may preferably be formed from any suitable transparent material, and in one preferred embodiment, the shroud is formed from an optical grade acrylic. A window 192 disposed in an aperture in a front wall 194 of shroud 190 is formed from an high grade optical glass, for example float glass or other similar material to minimize distortion of the reflected light returning to the camera optics. Window 192 may be secured to shroud 190 by fasteners or other means that securely maintains the window in place. Suitable fasteners would include clips, pins, press-fitting the glass into the shroud opening, etc.

Illumination module 128 is secured to chassis module 124 by a tongue 196 (FIG. 6) formed on chassis module 124 that is received in a groove 198 formed in bottom wall 172. Once the illumination module groove 198 receives chassis tongue 196, a lip 200 formed on top wall 170 is secured to a chassis top wall 202 by fasteners (not shown), for example screws, bolts, etc.

Figure 11:
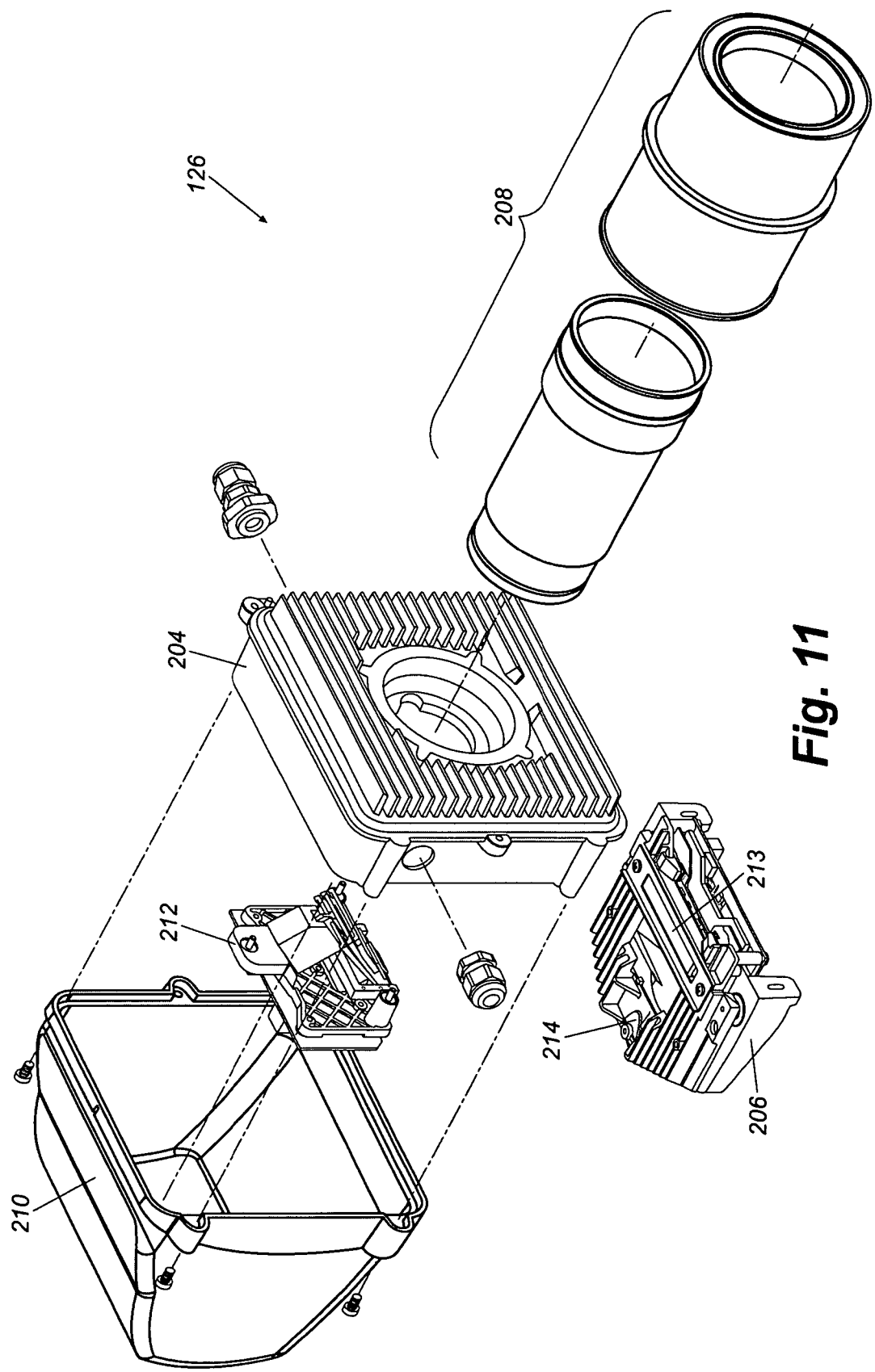
FIG. 11 is an exploded perspective view of a camera module for use in the camera shown in FIG. 4.
Figure 12:
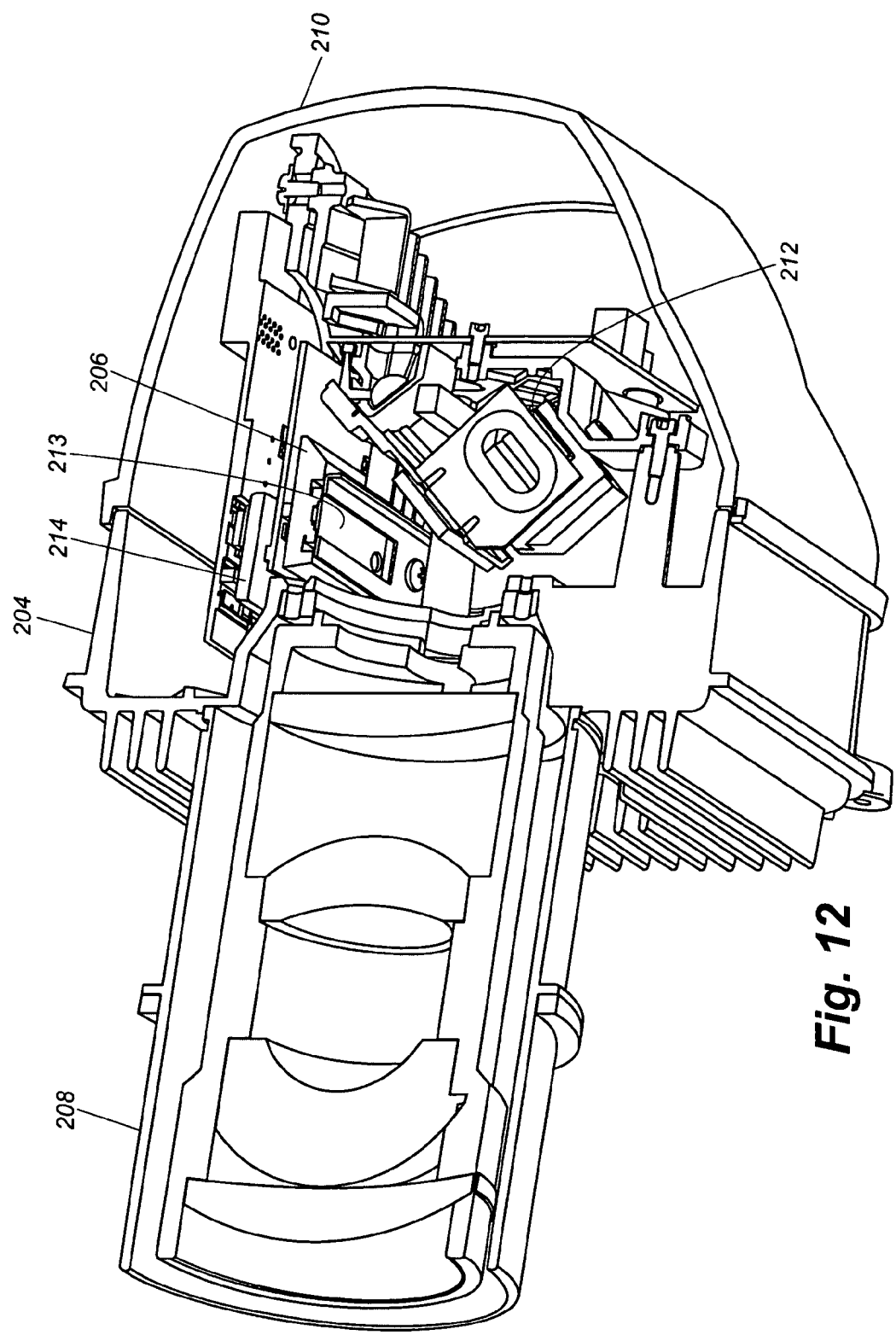
FIG. 12 is a perspective cutaway view of the camera module shown in FIG. 12.

Referring to FIGS. 11 and 12, camera module 126 comprises a body 204, a sensor module 206, a fixed focal length lens 208 and a cover 210. A focus servo module 212 may be a closed loop servo system that controls the movement of a motor (not shown) that adjusts the focal length between main imaging lens 208 and sensor 213. Focus servo module 212 receives commands from a camera module processor 214, which are used to adjust the focal length between main imaging lens 208 and sensor 213 by moving a mirror located between the camera senor and the fixed optics. Camera module 126 uses a hinged mirror focus system (such as that described in U.S. Pat. No. 6,801,260 assigned to Accu-Sort Systems, Inc., the entire disclosure being incorporated by reference herein) to adjust the optical distance between the main imaging fixed focus lens and sensor.

Imaging lens 208 may have a fixed focal length of 68.5 mm, 90 mm and 140 mm, which should provide sufficient coverage for most applications of camera 100 (barcode and OCR applications in auto identification markets). However, it should be understood that other fixed focal lengths may be used depending on the application of camera 100. Sensor module 206 contains two circuit boards (not shown) and an imaging array 213. In one preferred embodiment, the imaging array is an 8000 pixel linear array, 4-tap Dalsa charge-coupled device sensor with a video output of 8 bits per pixel. It should be understood by those of skill in the art that other types of CCD sensors may be used. If the sensor board is operated at its maximum rate of 40-MHz per tap, the sensor board can produce video at a rate of approximately 160 mega pixels per second.

Figure 13:
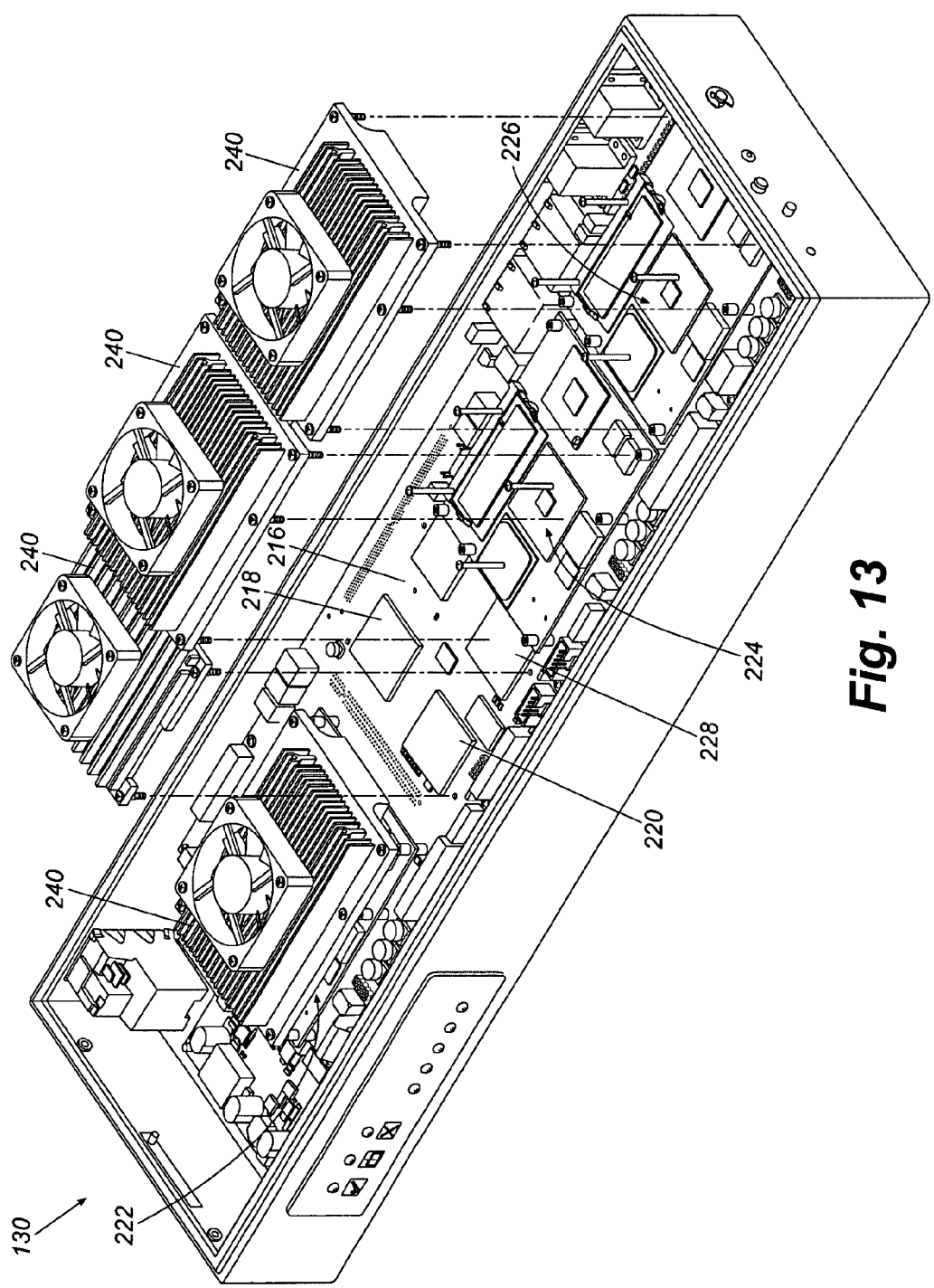
FIG. 13 is an exploded perspective view of a communication module for use in the camera shown in FIG. 5.
Figure 14:
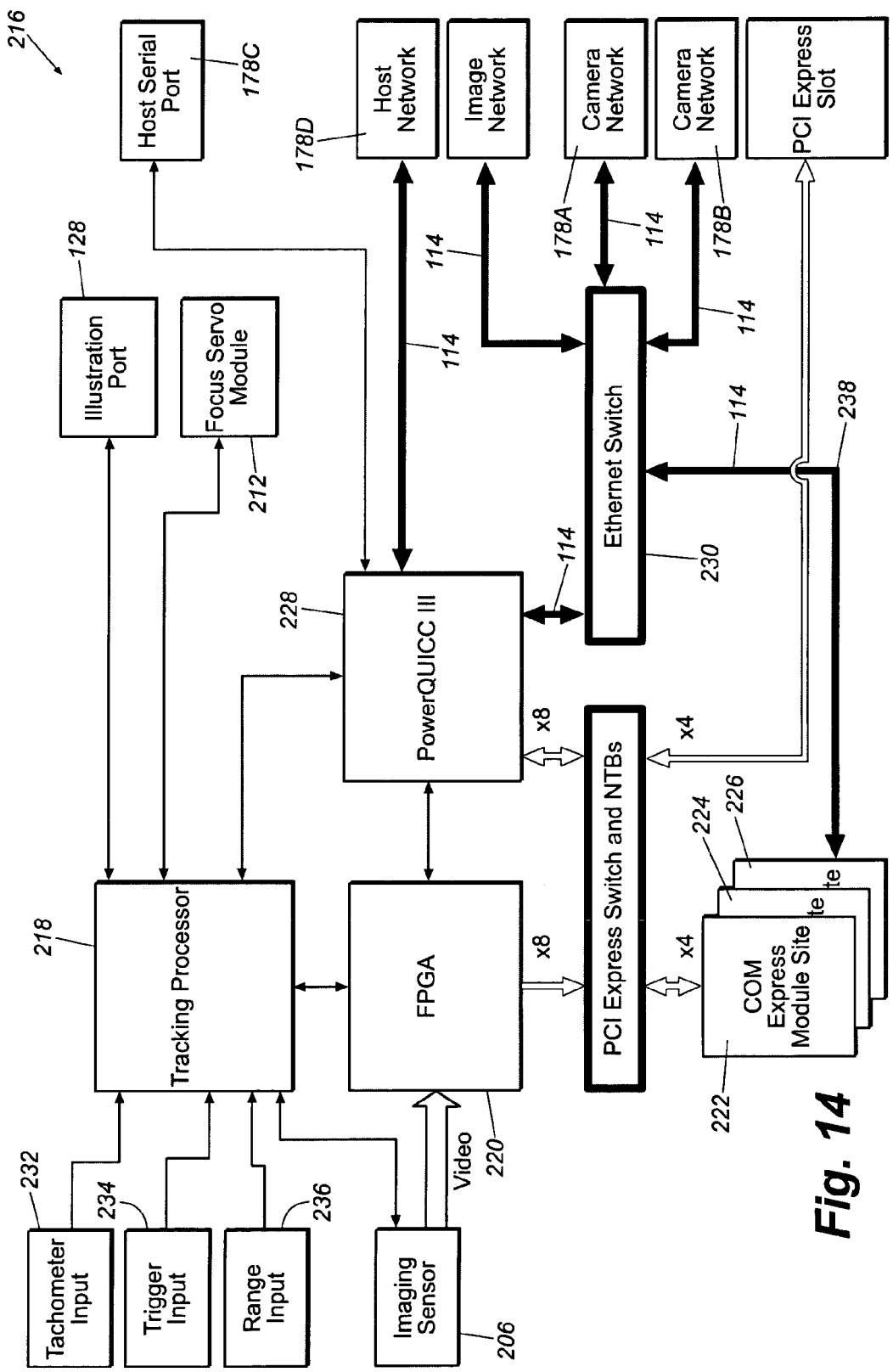
FIG. 14 is a block diagram of the communication module shown in FIG. 13.

Referring to FIGS. 13 and 14, distributed processing and communications module 130 comprises a carrier card 216, a tracking processor 218, a video processor 220, three COM express modules 222, 224 and 226, and a communications processor 228. Carrier card 216 provides the platform for all video processing performed by camera module 106. Video from imaging module 206 is received by video processor 220 where it is processed in real time and transferred to COM Express modules 224, 224 and 226 and communications processor 228 for further processing. The communication processor and COM Express modules communicate with one another and external devices by Ethernet connections 114 through an Ethernet switch 230, and/or through a PCI express switch.

Tracking processor 218 receives an input signal from tachometer 112 at input 232, a trigger signal at input 234 and range information from range finder 102 at input 236 and uses the information to track an object's presence, location and height, as in prior art systems. Tracking processor 218 also provides control and diagnostic commands to illumination module 128 and camera focus servo module 212. Thus, as objects are transported down conveyor belt 104 (FIG. 2), the tracking processor tracks their position relative to camera 106 and height and location information on belt 104. In response to this information, tracking processor 218 sends commands to illumination module 128 to increase or decrease the illumination intensity and to camera focus servo module 212 to adjust the focus of the camera optics to properly acquire a readable image from the objects. In one preferred embodiment, tracking processor 218 is an i.MX31L manufactured by Freescale Semiconductor of Austin, Tex.

Video processor 220 provides all high-speed video processing and handles all real-time control signals from, for example, tachometer 112 and trigger input 234. Video processor 220 conditions and processes tachometer input signal 232 and stamps the tracking information into the linear sensor image data. Video processor 220 also buffers lines of video data from image sensor 206, packs the lines into 64-bit words and puts the words into the memory of communications processor 228 and COM Express modules 222, 224 and 226. Video processor 220 maintains a constant scan speed of imaging sensor 206 based on tachometer input signal 232 and the line density configured in the system.

Communications processor 228 receives data input from tracking processor 218 and video data from video processor 220. The main function of communications processor 228 is to move image data from video processor 220 to COM Express modules 222, 224 and 226. Examples of communications processor 228 are the MPC8548E, MPC8547E, MPC8545E and MPC8543E all manufactured by Freescale, Inc. of Austin, Tex.

COM Express modules 222, 224 and 226 allow expansion of camera 106 without camera system redesign and can be added at any time to provide additional functionality without requiring modification to carrier card 216. Specifically, modules for performing additional features such as dimensioning, optical character recognition, etc. can be installed in camera 106 at any time through the COM Express modules. The FPGA 220 is constantly providing camera data to the COM Express modules and communication module 228, which can be used for example for OCR or dimensioning. Each COM Express module 222, 224 and 226 has an Ethernet connection 238 to communications processor 228 through Ethernet switch 230, in addition to a PCI express connection.

Each camera has two network ports 178A and 178B that allow the cameras to be linked together. The dedicated network has 100BaseT Ethernet and has two hardwired signals: a tachometer pulse and a tachometer synchronization signal. The tachometer signal is sourced by the camera having tachometer 112 attached to it. The tachometer synchronization signal is a derivative signal of the tachometer signal, which is directly transmitted to each of the cameras to ensure that each camera can accurately track any given package independently of the other cameras. By monitoring these two signals, all of the cameras in the tunnel can stay in perfect synchronization with a package on conveyor 104 and with each other by simultaneously counting tachometer pulses for each package on the conveyor system. Network ports 178A and 178B allow information from one camera on the network to be transmitted to any other camera on the tunnel network. Each camera also contains two ports 178C and 178D for connecting to the host system. The first port 178C outputs an asynchronous signal and the second 178D is a 100BaseT Ethernet connection. The imaging network connection outputs image data to the host system for further processing. The PCI Express slot is a standard PCI slot that accepts upgrade cards to provide further processing features for camera 106.

For example, a PCI card may be used to allow camera 106 to provide real time JPEG compression, which may be output to the host system.

The power consumed by camera 106 may be above 180 watts, of which 15 to 20 watts may be emitted as light. The remaining power is converted to heat, which must be removed from the camera so as not to damage the electronics. Because camera 106 contains sensitive optics and electronics, camera module 126, illumination module 128 and communications module 130 are preferably not cooled by traditional methods of pulling air through each module, since dirt and debris could accumulate on the electronic and optics.

Figure 15:
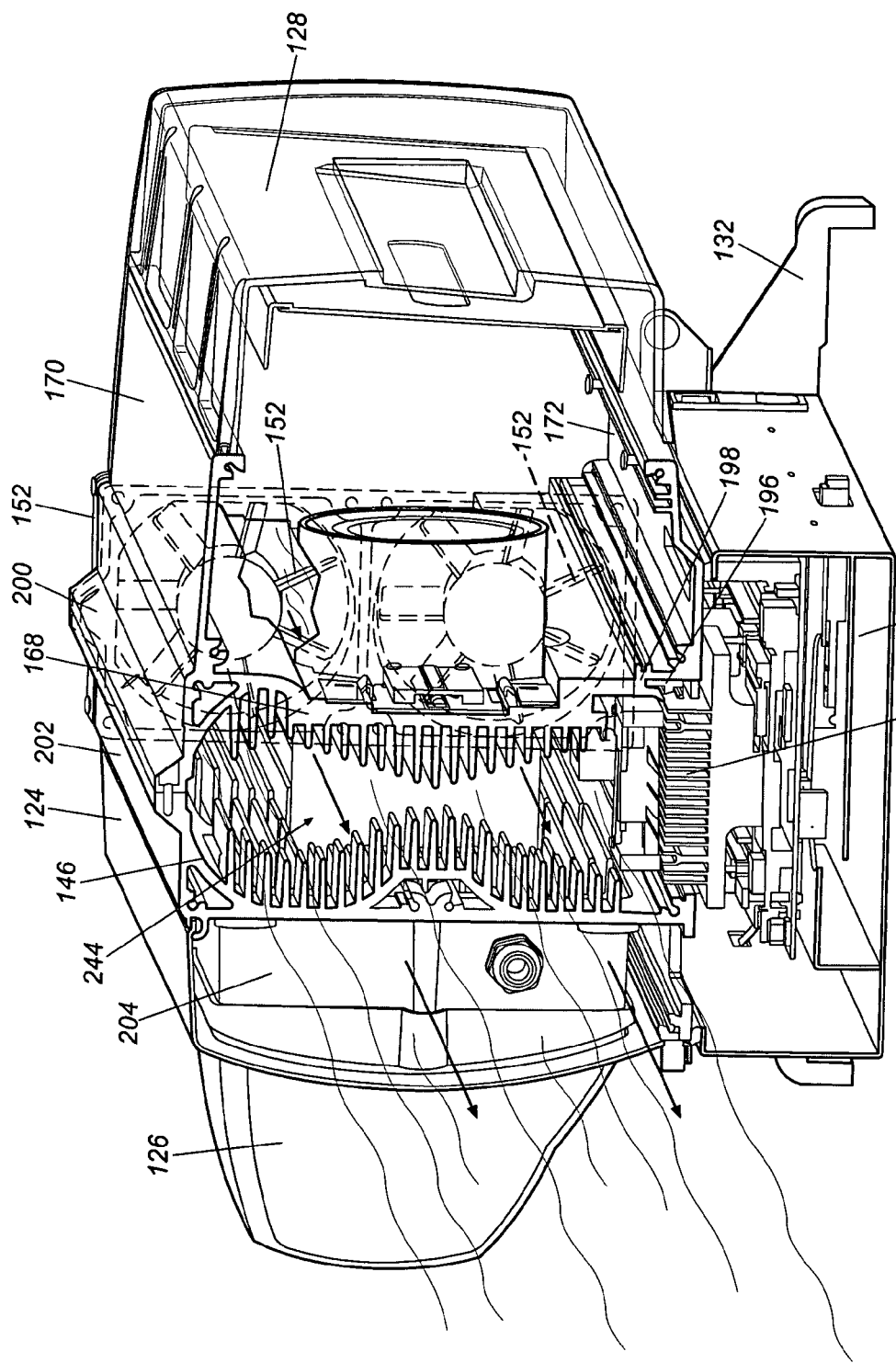
FIG. 15 is a perspective cutaway view of the camera of FIG. 5.

Referring to FIG. 15, the individual modules of camera 106 fit together to form a cooling channel 244. In particular, camera module body 204 fits into opening 155 (FIG. 6) to form continuous chassis rear wall 146. Illumination module 128 is secured to chassis bottom wall tongue 196 by groove 198 and to top wall 202 by a plurality of fasteners, such as screws, bolts or clips as previously described. Communication module 130 is secured to camera chassis 124 by brackets 136 and 138 (FIG. 7), which allow the communication module to pivot about one end 133 so that a user can service the communication module without having to physically remove it from the camera.

When communications module 130 is in its closed position, heat sinks 240 are received through chassis bottom wall openings 158. As a result, illumination module rear wall 168, camera chassis rear wall 146, communications module heat sinks 240 (only one of which is shown in FIG. 15) and chassis bottom wall 140 (not shown in FIG. 15) together define cooling channel 244, which is sealed from the sensitive optics and electronics of the camera. Each of the cooling channel walls contains a plurality of metallic fins to conduct heat away from the electrical components into the cooling channel to assist in heat dissipation. Fans 152 and 154, located at each end of cooling channel 244, pull air into one end and push air out the other end of the channel to expel the heat from the camera. In one embodiment, a fan forced air flow of approximately 130 cubic feet per minute should maintain a desired temperature range within the camera.

Cameras 106, 108 and 110 may play different roles in a scanning tunnel. Preferably, for example, one camera is designated as the master camera. The master camera receives a trigger signal and the system tachometer signal and provides a trigger signal and focus information to other cameras in the tunnel. One camera (either the master camera or one of the slave cameras) is connected to the host system and is responsible for transmitting package data to the host system.

Data collected by each camera for a single box is combined into a single message that is transmitted to the host system when the package reaches a transmit point. Barcode and package information may be transferred between cameras over the 100Base-T Ethernet network. Each of camera modules 106, 108 and 110 is capable of correlating the messages from all of the other cameras in the tunnel system and generating a combined message. That is, if the master camera receives all of the camera data from the other cameras, it can correlate the multiple image data and transmit the combined data to the host system. Because each of the cameras have the ability to receive data from the other cameras and correlate the combined data, two camera modules in the same tunnel system may be connected to different host systems, each with a different data format and transmit points. Additionally, because all of the cameras are networked, one camera could perform processing for data collected by another camera should a camera loose the ability to process data. Moreover, each camera contains set-up and calibration data about every other camera in the tunnel system.

Figure 18:
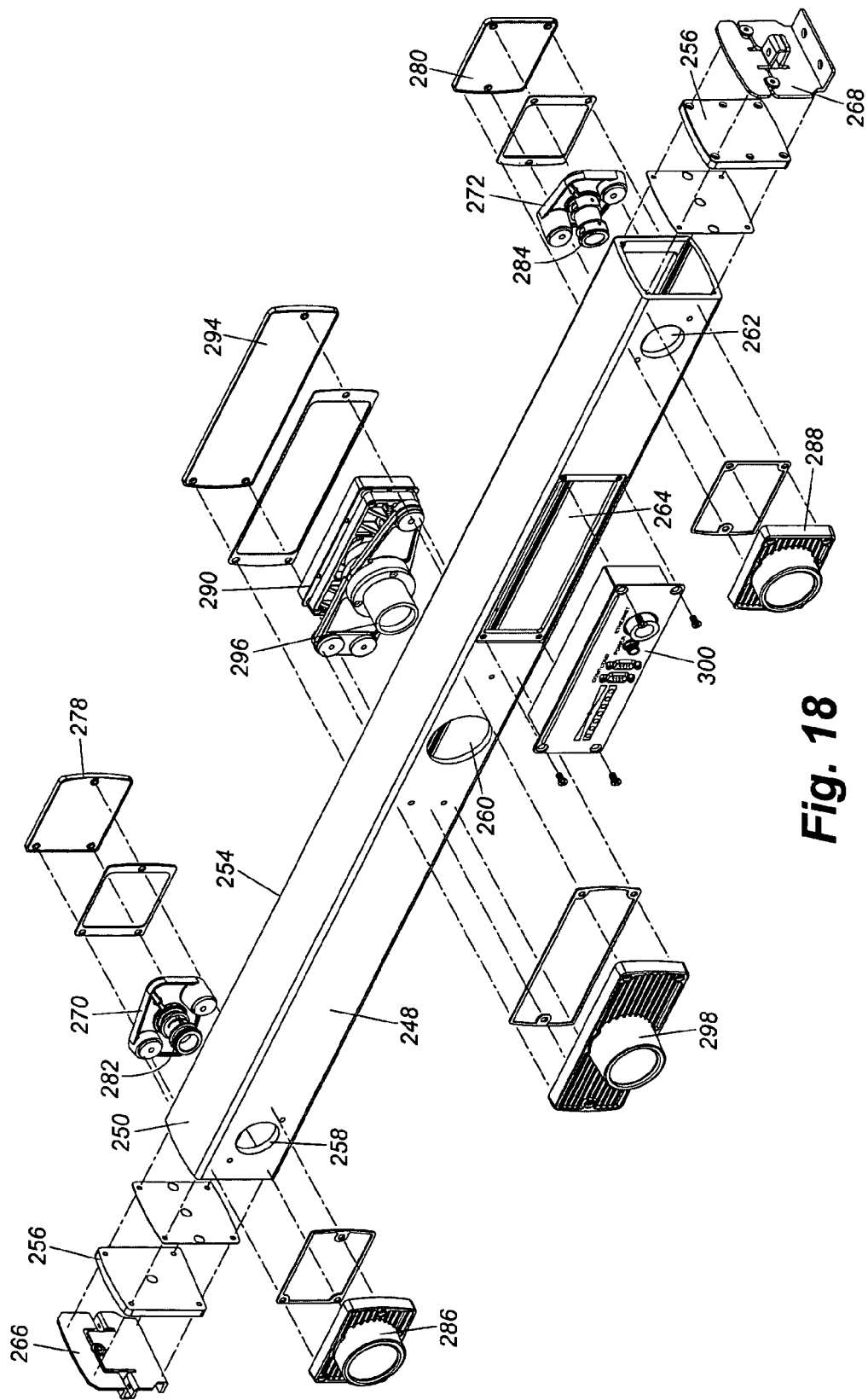
FIG. 18 is an exploded perspective view of the range finder of FIG. 16.
Figure 22:
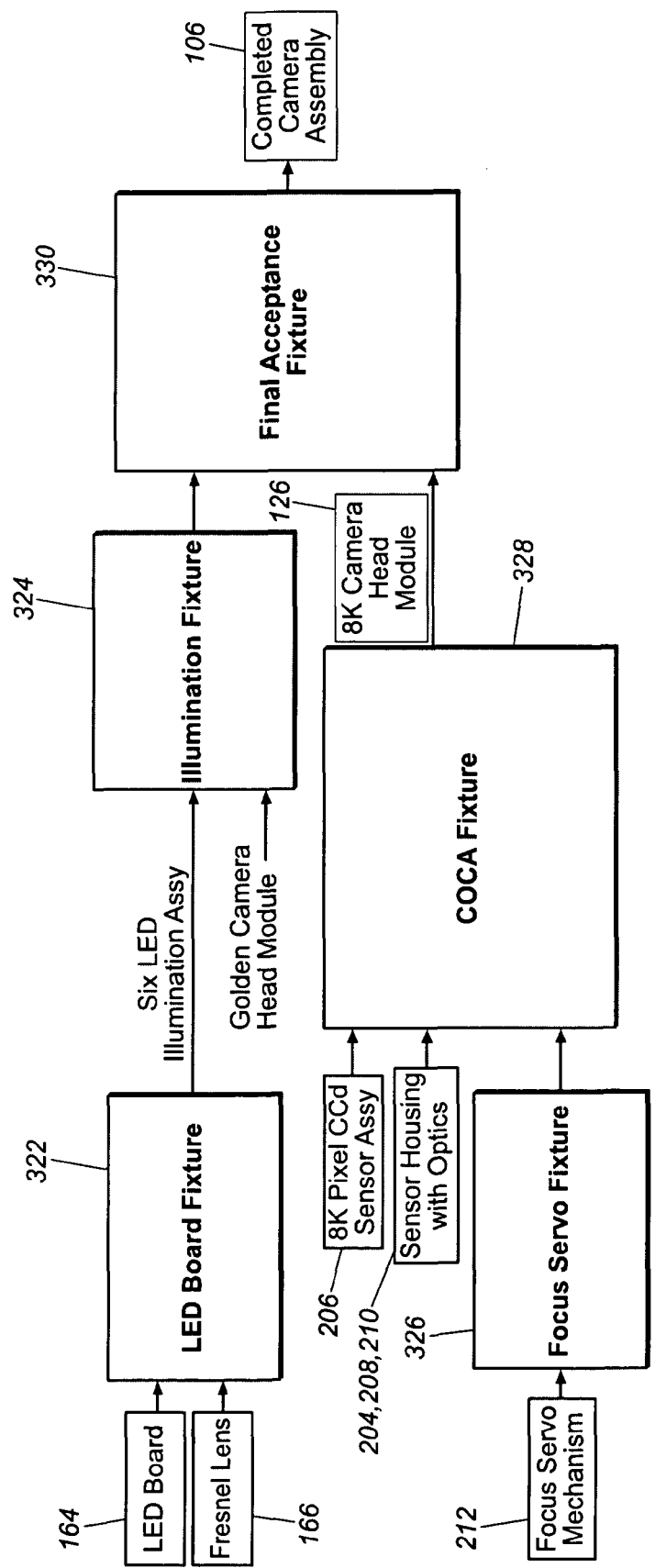
FIG. 22 is a block diagram of the assembly of the camera of FIG. 5.
Figure 23:
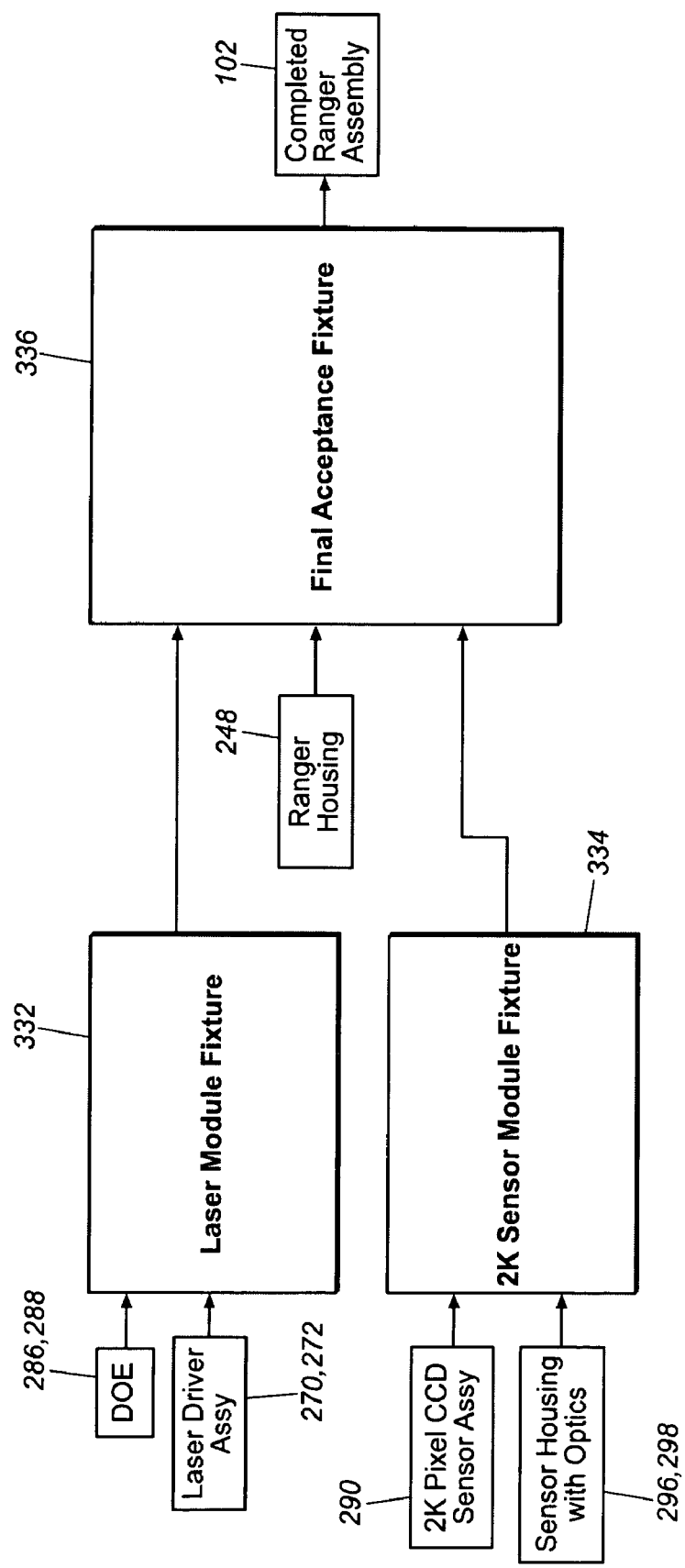
FIG. 23 is a block diagram of the assembly of the range finder of FIG. 16.

FIGS. 16 and 17 illustrate one embodiment of a range finder for use in the tunnel system of FIG. 3. Range finder 102 has a housing 246 formed from a front wall 248, a top wall 250, a bottom wall 252, a back wall 254 and two end walls 256. Referring to FIG. 18, front wall 248 defines three circular openings 258, 260 and 262 and one rectangular opening 264. Two brackets 266 and 268 are mounted to end walls 256 and allow the range finder to be mounted to the frame of the tunnel system.

Range finder 102 has two laser illumination devices 270 and 272 mounted proximate each end of housing 246 in respective openings (not shown). The laser devices are fastened to housing 246 and secured in place by cover plates 274 and 276 (FIG. 17). A respective front end 282 and 284 of the laser illumination devices extend into respective front wall openings 258 and 262. Each laser device front end 282 and 284 is enclosed by a respective diffractive optical element and covered by covers 286 and 288 having a clear window, which are fastened to range finder front wall 248 over openings 258 and 262 by fasteners or other suitable connecting devices. A range finder linear sensor board 290 is received in a rectangular opening (not shown) formed in housing back wall 254 and is secured in place by a cover plate 292 by screws, bolts or other suitable fasteners. A sensor head 296 extends through housing front wall opening 260 so that the sensor optics are covered by a lens cover 298, which is fastened to housing front wall 248. A control panel 300 is received in housing front wall rectangular opening 264 and is secured in place with screws, bolts or other suitable fasteners.

Referring to FIG. 19, laser illumination devices 270 and 272 and their respective diffractive optical lenses (not shown in FIG. 19) are used to generate a laser pattern 302 with a spatially-unique bar arrangement (FIG. 20). Laser illumination devices 270 and 272 are placed at an angle θ with respect to an axis 308 normal to conveyor 104. Referring to FIG. 21, the spatially-unique bar arrangement consists of a series of long lighted bars 314 and short lighted bars 316 that are separated by short blank (non-lighted) spaces 318 and long blank (non-lighted) spaces 320. Narrow lighted bars are one pixel wide, narrow blank spaces are two pixels wide, wide lighted bars are three pixels wide and wide blank spaces are four pixels wide. The spatially-unique bar arrangement contains one hundred and ninety-nine words, where a code word is defined by six elements and is approximately twenty pixels wide. The unique pattern is defined by seventy-eight words and repeats three times to fully cover the belt width. In one embodiment of the unique pattern, there will never be three wide bars or blank spaces in a row. Thus, if three elements are consecutive and of similar widths, they must be narrow bars or spaces. The spatially-unique bar arrangement is also known as a T-bar sequence.

It should be understood by one skilled in the art that as laser pattern 302 spreads to the outer extents of the belt, the elements increase in width. Moreover, when a box intersects laser pattern 302, the portion of the pattern on the top of the box will compress in width since the distance to the top of the box from the laser source is shorter than the distance to the belt. However, because all of the bars and spaces compress, the unique words remain unchanged and does not effect the operation of the range finder.

In some embodiments, the diffractive optical elements may generate a series of light dots across the width of the belt instead of the unique code word pattern. However, the series of light dots are subject to the same alignment problems that exist with prior art dimensioner designs since the line of dot must be properly aligned with the field of view of the linear sensor. In an effort to overcome the alignment issues, in other embodiments equally spaced light bars may be used where the height of each bar is multiple pixels high. In the case of the equally spaced bar pattern, the alignment problem is overcome since acceptable alignment error is increased based on the height of the bars. However, both the equally spaced light dots and equally spaced light bars both suffer from overlap problems. That is, if the dots and bars are not sufficiently spaced apart, then one dot or bar may shift more than the spacing between adjacent dots or bars resulting in an incorrect height measurement calculated for the box. If the spacing between dots or bars is narrowed to increase the resolution of the range finder, the maximum box height for the system will be limited. If, on the other hand, the dot or bar spacing is increased to accommodate large box heights, the resolution of the dots or bars across the belt is reduced. With large spacing between the dots or bars, while the box height may be obtained, the ability to accurately detect the extents of the box is diminished. Thus, substituting the unique laser code word pattern in place of equally spaced dots and bars overcomes both the sensor alignment and overlap issues.

An optical axis 304 and 306 of each laser device is offset from an optical axis 308 of linear camera sensor 296 by a predetermined distance 310 by an angle θ, which allows for the linear sensor to be positioned transverse to conveyor belt 104 instead of being parallel with the axis of travel of conveyor 104. Angle θ is used by the range finder processor to determine the height of a package using known triangulation methods. The purpose of having two laser devices 270 and 272 is to eliminate the effect of shadowing caused by a single light source. That is, if a single laser source 270 is used, then the portion of belt 104 adjacent to the left side of an object traveling down conveyor 104 will not be illuminated by the laser pattern since the object will block this portion of the belt from being illuminated. Consequently, the addition of second laser device 272 allows for each laser device to be cycled on and off at a rate that causes a complete scan line to be projected at each point along the length of the belt, thereby effectively eliminating the effects of shadowing.

As an object passes into illumination laser device fields of view 302, the spatially-unique bar arrangement shifts transverse to the direction of travel on conveyor 104, which is sensed by a field of view 312 of linear sensor 296. Because the laser pattern across the belt is unique, the shifted portion of the pattern can be detected, and based on known triangulation methods the amount of shift can be translated into a height for the detected object. The extent of the pattern found at the object height indicates the left and right extents of the object. The object height and extent information is correlated with tachometer count information and transmitted over Ethernet network 114 to camera modules 106, 108 and 110, and the resultant package information is used to drive camera focus servo module 212. Range finder linear sensor board 290 contains a processor (not shown) that captures images picked up by sensor 296, processes the images to determine if objects are present within range finder field of view 312 and determine the object's height and extents (left and right edges) on a line-by-line basis.

In one embodiment, linear sensor 296 is a Toshiba 1209D 2000 pixel, single tap, charged coupled device sensor and the processor is an i.MX31L processor manufactured by Freescale Semiconductor of Austin, Tex. For a belt speed of six hundred and twenty feet per minute, range finder 102 can perform 2,480 sample lines per second, which yields a resolution of $\frac{1}{20}^{th}$ of an inch in the direction of travel and produces a video rate of about five megabytes per second. Laser illumination devices 270 and 272 operate at 658 nm wavelength and the laser is collimated with a spot diameter of 2.5×7.0 mm. Each laser illumination device and DOE is offset 20 inches from the center of conveyor 104, and laser devices 270 and 272 are directed at a 13.94 degree angle θ with respect to axis 308. The range finder image plane is located 76 inches from the plane of the conveyor. In this configuration, the system can accommodate a maximum package size of 36 inches wide and 36 inches high. It should be understood that other configurations are within the scope of the present invention and the above configuration is merely presented as one example configuration. For example, the maximum box height that can be detected by range finder 102 without a unique code word shifting from one portion of the unique pattern to a portion where the pattern repeats is approximately 50 inches high. Thus, the position of the laser devices can be placed in other configurations to accommodate box heights up to 50 inches tall.

Figure 24:
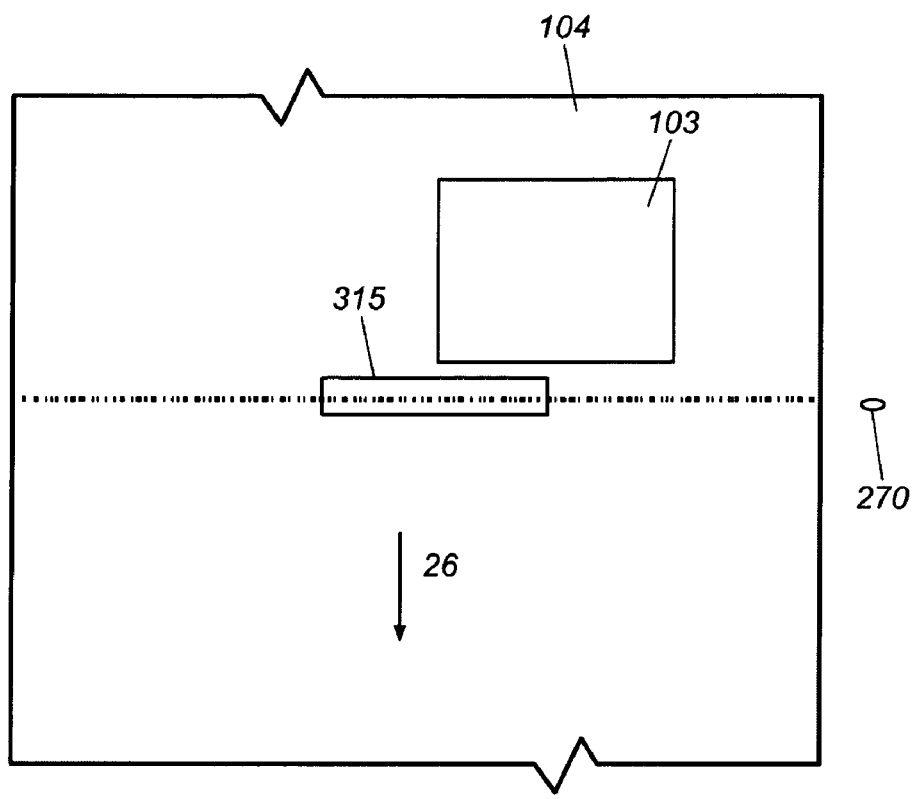
FIG. 24 is a plan view of the conveyor and range finder of FIG. 16.
Figure 25:
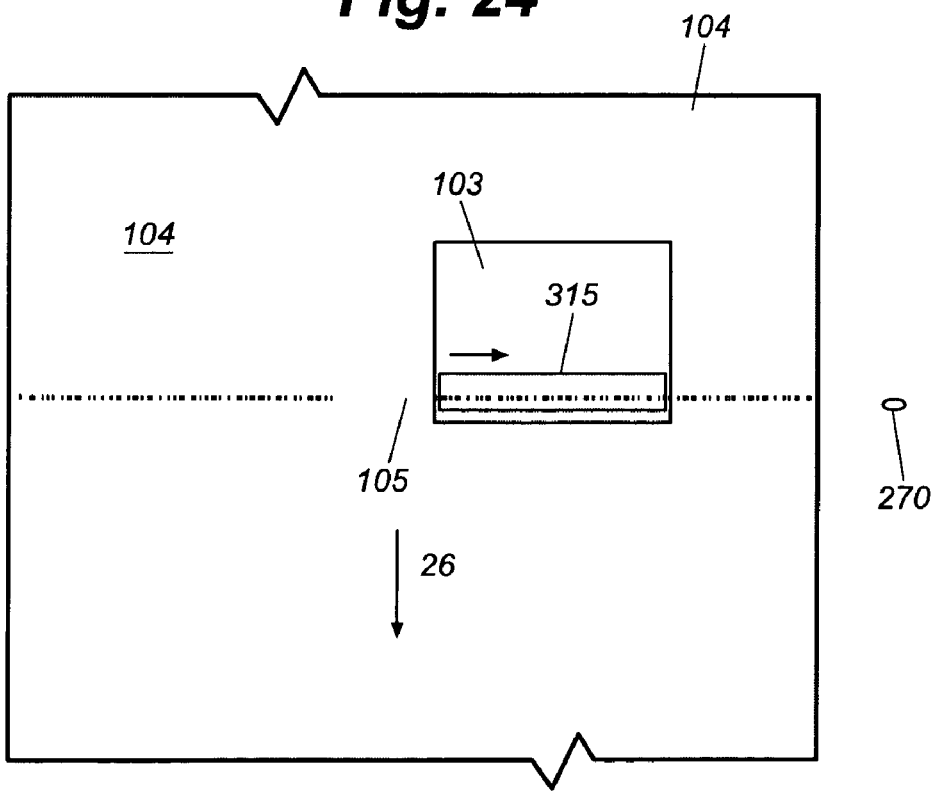
FIG. 25 is a plan view of the conveyor and range finder of FIG. 16.

In operation and as previously described, range finder 102 detects the height of objects moving along conveyor belt 104 by detecting the longitudinal shift of a laser pattern projected across the belt when the object intersects the laser pattern. In particular and referring to FIGS. 24 and 25, a box 103 is shown moving along conveyor 104 in direction 26. Laser 270 projects the unique laser line pattern sequence across the width of belt 104. As box 103 passes through the light pattern, a portion 315 of the unique code shifts to the right since the box is present. A portion of the unique line pattern 105 is not seen on the belt due to shading caused by box 103. The linear range finder sensor is positioned transverse to the direction of belt travel and detects a series of light and dark areas along the width of the belt. These light and dark areas are converted to a detected illumination intensity signal that is used by the range finder processor to detect the edges of the bars and spaces.

Figure 26:
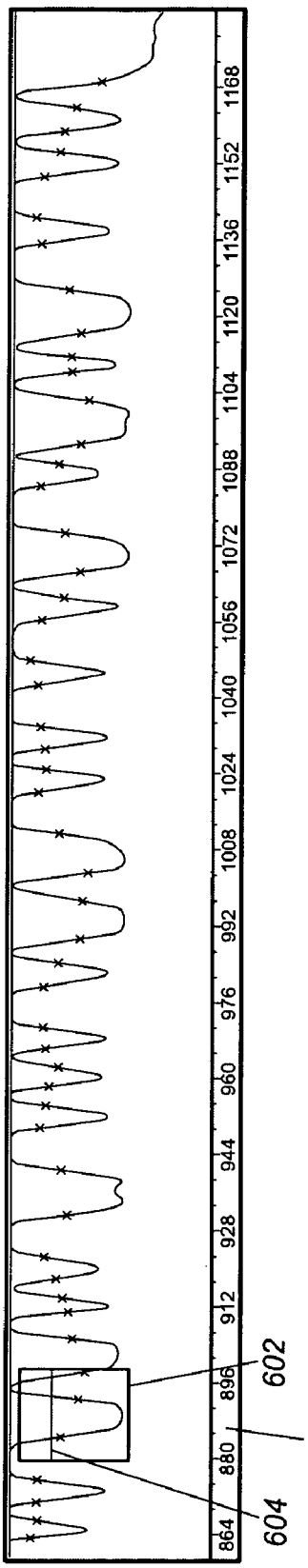
FIG. 26 is a intensity plot by pixel for the range finder of FIG. 25.
Figure 27:
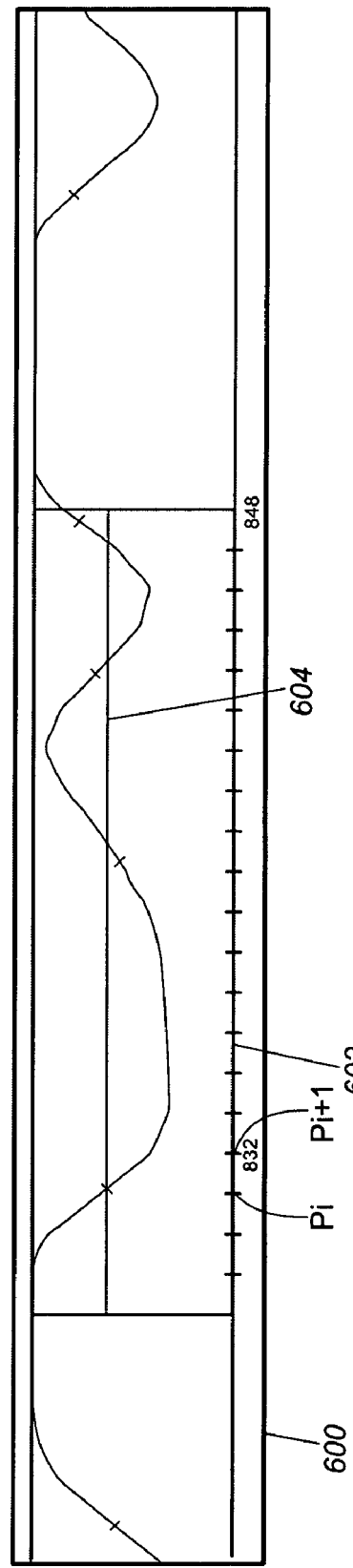
FIG. 27 is a close up view of the intensity plot of FIG. 26.

Referring to FIGS. 26 and 27, the illumination intensity signal is shown plotted versus pixel number in graph 600. The range finder processor carries out an edge detection programming routine by first selecting a sliding window 602 of twenty pixels and then calculating an average illumination intensity 604 over the twenty pixel window. If the intensity between adjacent pixels $P_i$ and $P_{i+1}$ cross average intensity line 604, an edge between a lighted bar and a non-lighted space is determined to be present between pixels $P_i$ and $P_{i+1}$. The following linear interpolation formula is used to calculate the approximate position of an edge with respect to a particular pixel $P_i$:

$$\text{Offset} = (\text{Average Intensity}_{twenty\ pixel\ window} - P_{i\ intensity}) / (P_{i+1\ intensity} - P_{i\ intensity})$$

The actual location of an edge is equal to $P_i$+Offset. Window 602 is shifted by one pixel and the average intensity calculation is repeated another edge is detected and the process is repeated until all edge locations are detected across each the width of the sensor array. It should be understood that if the intensity increases from $P_i$ to $P_{i+1}$, then the transition is from a bar to a space, and if the intensity decreases from $P_i$ to $P_{i+1}$, then the transition is from a space to a bar.

After all edge locations are detected across the width of the belt, the range finder processor calculates the width of a bar or space based on the following formula:

$$\text{Width}_i = \text{edge location}_{i+1} - \text{edge location}_i$$

Once all bar and space widths have been determined, code word extraction is performed by examining six consecutive widths: three bars and three spaces. For the three bars, the widest (W) and narrowest (N) bars are determined. If W/N>7/5 and W−N>2.5 then there exists at lease one wide bar and a least one narrow bar. Otherwise, all three bars must be narrow since, in one embodiment, there cannot be three adjacent wide bars. If it is determined that one wide bar and one narrow bar exists, then if the middle bar width>(W+N)/2, then the third bar is also wide, otherwise the third bar is narrow. The above code word calculations are repeated for all spaces between the bars. The pixel widths of each of the narrow and wide bars and spaces drive the above rations for determining whether detected edges define a wide or narrow bar or space. At this point, the processor can determine the order of bars and spaces and the location of the code words with respect to the width of conveyor belt 104.

In the above described embodiments, the heights of boxes placed on the conveyor should not be larger than 51 inches to ensure that a shifted code word does not move into the repeated portion of the unique pattern. If, on the other hand, a box having a height greater than 51 inches is placed on the conveyor causing a code word to shift into the repeated portion of the unique pattern, the measured height of the box would not be accurate. However, a disambiguation step can be performed to ensure that larger boxes are properly measured so that the cameras are accurately focused.

As previously described, a fundamental property of the unique bar pattern is that each instance of a codeword is located in at most three disjointed locations across the width of the belt since the unique pattern repeats approximately two and one-half times, Thus, to account for the possibility of a code word shifting into the repeated portion of the pattern, a photo-eye or light curtain (not shown) may be placed upstream from range finder 102 to detect when a box greater than 51 inches approaches the range finder. If the photo eye or light curtain (not shown) detects a box greater than 51 inches in height, the range finder processor adds 51 inches to the measured height of the box. That is, because a shift in a code word will move into the repeated portion of the pattern when a box is greater than 51 inches, the measured height of the box would be the actual height minus 51 inches. For example, if a box having a height of 53 inches passes under range finder 102 and a code word from the first portion of the pattern shifts into the second repeated portion, then the measured height of the box would be based on the amount of shift of the code word from the original location of the second occurrence of the code word and not the amount of the shift from the original first occurrence of the code word. As such, the calculated height of the box would be two inches instead of 53 inches. Thus, to account for disambiguation, the system adds 51 inches to the measured shift resulting in the correct height of the box.

After disambiguation, the range finder processor calculates the shift in code words. When the range finder is manufactured, a memory table is stored containing the pixel location of each code word at a far field (calibrated) which, in one embodiment is calculated at approximately seventy-six inches. Based on the pixel location of the shifted code word and the pixel location in the far field for the code word, the code word shift is calculated in pixel distance using the following formula:

$$\text{Code Word Shift} = \text{Pixel location}_{near\ field} - \text{Pixel Location}_{far\ field}$$

The range finder processor calculates the shift of each code word across the top of the box for each scan in pixels and converts the code word shift from pixel distance to inches using know conversion techniques. In one embodiment, the height h=code word shift*tan θ.

The range finder also detects the right and left extents of the box by detecting interruptions in code words, for example when two adjacent words are not in the correct order. That is, because the laser light projects from the left or right side of the belt, the last code word on the conveyor at the base of the box and the first code word on the top edge of the box will not be properly sequenced since a number of words will be projected onto the side of the box. Therefore, abrupt changes in the unique sequence will alert the range finder processor that an edge of the box has been detected. The same will be true on the opposite extent of the box furthest from the laser source. Because the box creates a shadow, there will be an abrupt change in the code word sequence at the furthest extent of the box and the belt.

At this point, a single slice profile of box 103 is stored in the range finder memory similar to prior art dimensioners. The range and extent information is transmitted to each camera and the information is used to focus the cameras. Range finder 102 takes multiple scans of box 103 over time and uses the height and extent information to build a 3-D model of the box. The 3-D model of the object and any barcode data obtained by the cameras in the tunnel are transmitted to the host system for further processing.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A modular camera comprising:
    a. a chassis module having
        i) a back wall having a first end and an opposite second end,
        ii) a bottom wall adjacent the back wall and between the first end and the second end, and having at least one opening formed therein,
        iii) a first fan mounted at said chassis back wall first end, and
        iv) a second fan mounted at said chassis back wall second end, and
    b. a camera module having
        i) a body,
        ii) a light sensor, and
        iii) optics,
            wherein said camera module body is removably received through a hole formed through said chassis module back wall,
    c. an illumination module having
        i) a wall, and
        ii) at least one light source,
            wherein said illumination module is removably coupled to said chassis module so that said illumination module wall is spaced apart from said chassis module back wall, and
    d. a communication module having at least one heat sink formed thereon and having at least one processor, wherein said communication module is removably coupled to said chassis module so that the at least one processor is in communication with the illumination module and the camera module and so that said at least one heat sink is received through said chassis module bottom wall at least one opening, wherein said chassis module back and bottom walls, said camera module body, said illumination module wall and said communication module at least one heat sink together form a cooling channel extending between the first end and second end so that the first fan and the second fan move an air flow through the channel adjacent the chassis module, illumination module, and communication module.

2. The modular camera of claim 1, wherein said first and second fans close off opposing ends of said cooling channel.

3. The modular camera of claim 1, further comprising a plurality of cooling fins formed on at least one of said chassis module back wall, said camera module body and said illumination module wall for dissipating heat into said cooling channel.

4. The modular camera of claim 1, said chassis module further comprising at least two mounting brackets for mounting said chassis module to a scanning tunnel frame.

5. The modular camera of claim 1, said chassis module further comprising at least two hinged brackets for coupling said communication module to said chassis module.

6. The modular camera of claim 1, wherein the communication module is pivotally secured to the chassis module.

7. A modular camera comprising:
a. a chassis module having a wall and comprising
  i) a first end and an opposite second end,
  ii) a first fan mounted at said chassis module first end, and
  iii) a second fan mounted at said chassis module second end, and
b. a camera module having a body, a light sensor mounted to the body, and a lens mounted to the body so that the lens directs light from an area outside the modular camera to the light sensor, wherein said camera body is removably received through said chassis module wall,
c. an illumination module having at least one light source, optics, and a wall, wherein said illumination module is removably coupled to said chassis module so that the at least one light source directs light through the optics to the area and so that said illumination module wall is spaced apart from said chassis module wall, and
d. a communication module having at least one processor and being removably coupled to said chassis module so that the at least one processor is in communication with the illumination module and the camera module,
  wherein said chassis module wall, said camera module body, said illumination module wall and said communication module together form a cooling channel extending between the first end and the second end so that the first and second fans move an air flow through the channel adjacent the chassis module, illumination module and communication module.

8. The modular camera of claim 7, wherein said chassis module first and second fans comprise a plurality of fans that close off ends of said cooling channel.

9. The modular camera of claim 7, wherein walls of said cooling channel further comprise a plurality of cooling fins for dissipating heat from said camera module, said illumination module and said communication module into said cooling channel.

10. The modular camera of claim 7, said chassis module further comprising at least two mounting brackets for mounting said chassis module to a scanning tunnel frame and two hinged brackets for releasably coupling said communication module to said chassis module.

11. A modular camera comprising:
a. a chassis module having a wall and having a first end and a second end opposite the first end;
b. a camera module having a body, a light sensor mounted to the body, and a lens mounted to the body so that the lens directs light from an area outside the modular camera to the light sensor, wherein said camera module is removably received by said chassis module, and
c. an illumination module having at least one light source and optics and being removably coupled to said chassis module so that the at least one light source directs light through the optics to the area,
d. a channel defined at least in part by said camera module and said illumination module and extending between the first end and the second end; and
e. at least one fan located at the first end so that said fan moves an air flow through said channel adjacent the camera module and the illumination module and into atmosphere surrounding said modular camera.

12. The modular camera of claim 11, further comprising at least one other fan located at said second end.

13. The modular camera of claim 11, further comprising a communication module having at least one processor and being removably coupled to at least one of said chassis module, said camera module and said illumination module so that the at least one processor is in communication with the illumination module and the camera module.

14. The modular camera of claim 11, wherein a wall of each of said chassis module, said camera module and said illumination module define walls of said channel.

15. The modular camera of claim 14, wherein said channel walls further comprise a plurality of cooling fins formed thereon for dissipating heat from said camera module, said illumination module and said chassis module into said channel.

16. The modular camera of claim 13, said chassis module further comprising at least two mounting brackets for mounting said chassis module to a scanning tunnel frame and two hinged brackets for releasably coupling said communication module to said chassis module.

17. The modular camera of claim 12, wherein said at least one fan and said at least one other fan comprise a plurality of fans that close off ends of said channel.

18. The modular camera of claim 13, said chassis module further comprising at least two hinged brackets for coupling said communication module to said chassis module.

19. The modular camera of claim 13, wherein
a. said camera module has a body removably received through said chassis module wall,
b. said illumination module has a wall, wherein said illumination module is removably coupled to said chassis module so that said illumination module wall is spaced apart from said chassis module wall, and
c. said communication module is removably coupled to said chassis module,
  wherein said chassis module wall, said camera module body, said illumination module wall and said communication module together form said channel.

20. The modular camera of claim 13, wherein the communication module is pivotally secured to the chassis module.

21. A modular camera, comprising:
a. a light sensor;
b. a lens disposed so that the lens directs light from an area outside the modular camera to the light sensor;
c. at least one light source;
d. optics disposed so that the optics direct light from the at least one light source to the area; and
e. a fan, wherein
the camera comprises a chassis module and a plurality of other modules,
in each respective other module is disposed at least one of the light sensor, the lens, the at least one light source, and the optics,
the other modules are removably attached to the chassis module so that a plurality of the modules together form a cooling channel, and
the fan is disposed at the cooling channel so that the fan moves an air flow through the cooling channel adjacent the plurality of modules.

22. The modular camera as in claim 21, comprising a processor in communication with the light sensor to receive signals therefrom corresponding to light received by the light sensor from the lens, and wherein the processor is disposed in one of the modules.

23. The modular camera as in claim 21, wherein the cooling channel defines a first end and a second end, and wherein the camera comprises a first fan and a second fan respectively disposed at the first end and the second end.

24. The modular camera as in claim 21, wherein walls of the cooling channel comprise a plurality of cooling fins for dissipating heat from at least one of the modules into the cooling channel.

25. A camera system, comprising:
a. a conveyor; and
b. a modular camera disposed above the conveyor and comprising:
i. a light sensor,
ii. a lens disposed so that the lens directs light from an area between the conveyor and the modular camera to the light sensor,
iii. at least one light source,
iv. optics disposed so that the optics direct light from the at least one light source to the area, and
v. a fan,
wherein
the camera comprises a chassis module and a plurality of other modules,
in each respective other module is disposed at least one of the light sensor, the lens, the at least one light source, and the optics,
the other modules are removably attached to the chassis module so that a plurality of the modules together form a cooling channel, and
the fan is disposed at the cooling channel so that the fan moves an air flow through the cooling channel adjacent the plurality of modules.

26. The camera system as in claim 25, comprising a processor in communication with the light sensor to receive signals therefrom corresponding to light received by the light sensor from the lens, and wherein the processor is disposed in one of the modules.

27. The camera system as in claim 25, wherein the cooling channel defines a first end and a second end, and wherein the camera comprises a first fan and a second fan respectively disposed at the first end and the second end.

28. The camera system as in claim 25, wherein walls of the cooling channel comprise a plurality of cooling fins for dissipating heat from at least one of the modules into the cooling channel.

29. The camera system as in claim 25, wherein the camera is mounted on a frame extending above the conveyor, and wherein the chassis module comprises at least two mounting brackets that mount the camera to the frame.

* * * * *